US012762919B2

(12) United States Patent
Izumida

(10) Patent No.: US 12,762,919 B2
(45) Date of Patent: *Oct. 13, 2026

(54) MONEY HANDLING APPARATUS AND MONEY HANDLING METHOD

(71) Applicant: Glory Ltd., Himeji (JP)

(72) Inventor: Tsuyoshi Izumida, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/313,951

(22) Filed: Aug. 29, 2025

(65) Prior Publication Data

US 2025/0391220 A1 Dec. 25, 2025

Related U.S. Application Data

(63) Continuation of application No. 18/811,788, filed on Aug. 22, 2024, now Pat. No. 12,424,048.

(30) Foreign Application Priority Data

Aug. 23, 2023 (JP) ................................ 2023-135687

(51) Int. Cl.
*G07D 11/245* (2019.01)
*G07D 1/06* (2006.01)

(52) U.S. Cl.
CPC ............ *G07D 11/245* (2019.01); *G07D 1/06* (2013.01); *G07D 2201/00* (2013.01); *G07D 2211/00* (2013.01)

(58) Field of Classification Search
CPC .... G07D 11/245; G07D 1/06; G07D 2201/00; G07D 2211/00; G07D 1/00; G07D 9/00; G07D 11/24; G07D 11/34
See application file for complete search history.

(56) References Cited

U.S. PATENT DOCUMENTS

| | | | | |
|---|---|---|---|---|
| 11,568,699 | B2 * | 1/2023 | Haishima | G07D 11/60 |
| 2010/0236996 | A1 * | 9/2010 | Folk | G07F 9/06 209/534 |
| 2014/0072696 | A1 * | 3/2014 | Nomura | G07D 11/125 118/712 |
| 2021/0134102 | A1 * | 5/2021 | Chen | G07D 11/18 |
| 2022/0230501 | A1 * | 7/2022 | Tagashira | G07D 9/002 |

* cited by examiner

*Primary Examiner* — Tuyen K Vo
(74) *Attorney, Agent, or Firm* — XSENSUS LLP

(57) ABSTRACT

A money handling apparatus includes: a first storage unit and a second storage unit; a transport unit; a recognition unit; and a control unit configured to transport the money in the first storage unit by the transport unit, recognize the money by the recognition unit, transport a part of the money from the first storage unit to the second storage unit based on a result of recognition to store money of predetermined denominations, for which a quantity of money of each denomination is set in advance, in the second storage unit. The control unit detects a shortage denomination of money in the first storage unit, and stores money of the shortage denomination larger in quantity than the quantity set in advance for the shortage denomination, into the second storage unit.

20 Claims, 13 Drawing Sheets

(A) DEPOSITING PROCESS:
RECOGNIZE COINS AND STORE COINS INTO FIRST STORAGE UNIT (B) DISPENSING PROCESS:
FEED OUT COINS FROM SECOND STORAGE UNIT, RECOGNIZE COINS, AND DISPENSE COINS (C) REPLENISHMENT PROCESS:
FEED OUT COINS FROM FIRST STORAGE UNIT, AND REPLENISH SECOND STORAGE UNIT WITH COINS (D) CHANGE OF HANDLING MODE:
CHANGE NUMBER OF COINS STORED IN SECOND STORAGE UNIT, BASED ON INVENTORY AMOUNT IN FIRST STORAGE UNIT

FIG.1

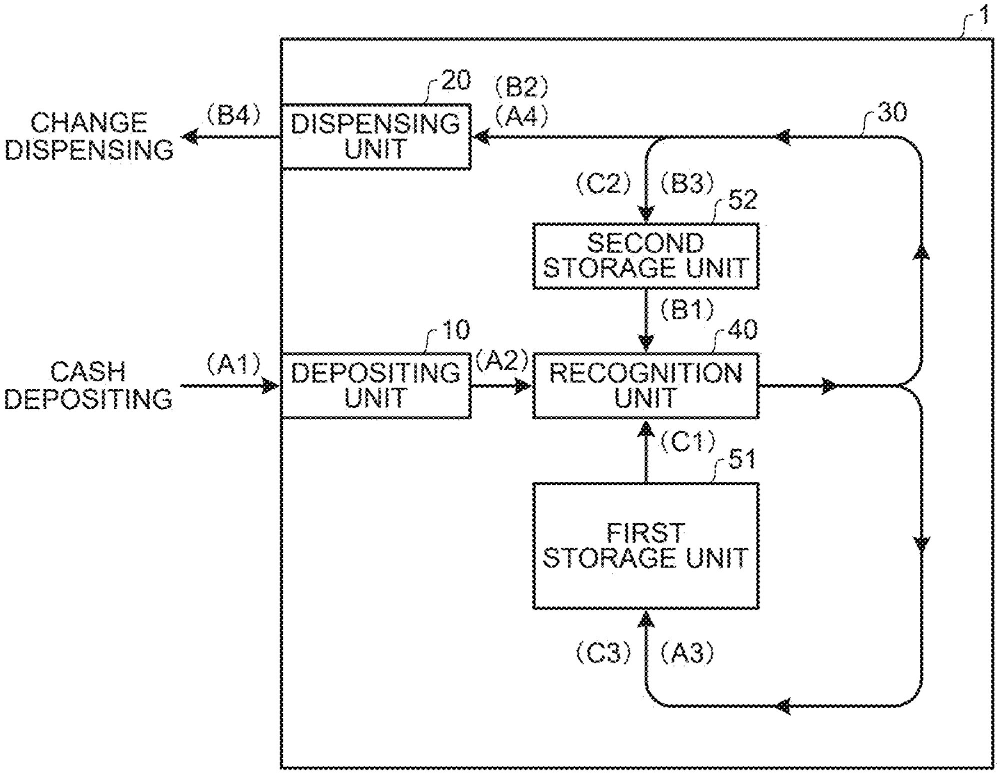

(A) DEPOSITING PROCESS:
RECOGNIZE COINS AND STORE COINS INTO FIRST STORAGE UNIT (B) DISPENSING PROCESS:
FEED OUT COINS FROM SECOND STORAGE UNIT, RECOGNIZE COINS, AND DISPENSE COINS (C) REPLENISHMENT PROCESS:
FEED OUT COINS FROM FIRST STORAGE UNIT, AND REPLENISH SECOND STORAGE UNIT WITH COINS (D) CHANGE OF HANDLING MODE:
CHANGE NUMBER OF COINS STORED IN SECOND STORAGE UNIT, BASED ON INVENTORY AMOUNT IN FIRST STORAGE UNIT

DEPOSITING PROCESS (NORMAL MODE)

DISPENSING PROCESS (NORMAL MODE)

REPLENISHMENT PROCESS
(NORMAL MODE, IN THE MIDDLE OF REPLENISHMENT)

REPLENISHMENT PROCESS
(NORMAL MODE, AFTER COMPLETION OF REPLENISHMENT)

FIG.5
DEPOSITING EXTENSION MODE
(DEPOSITING PROCESS)
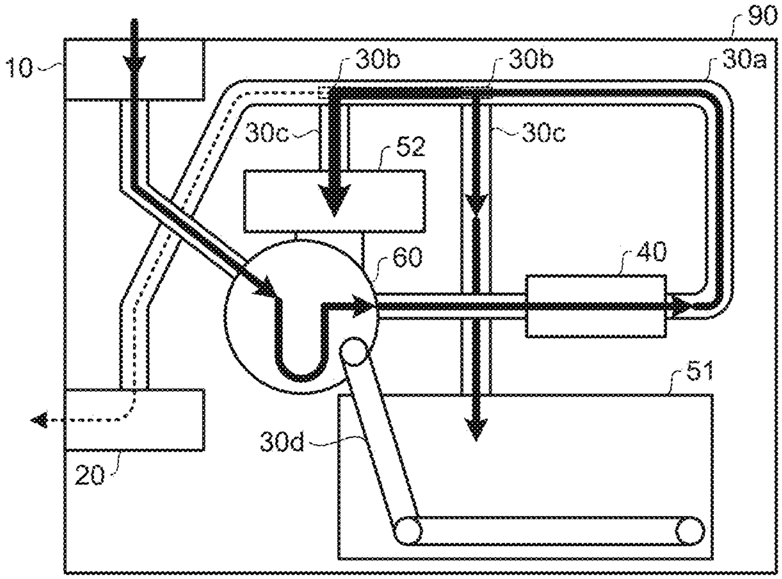
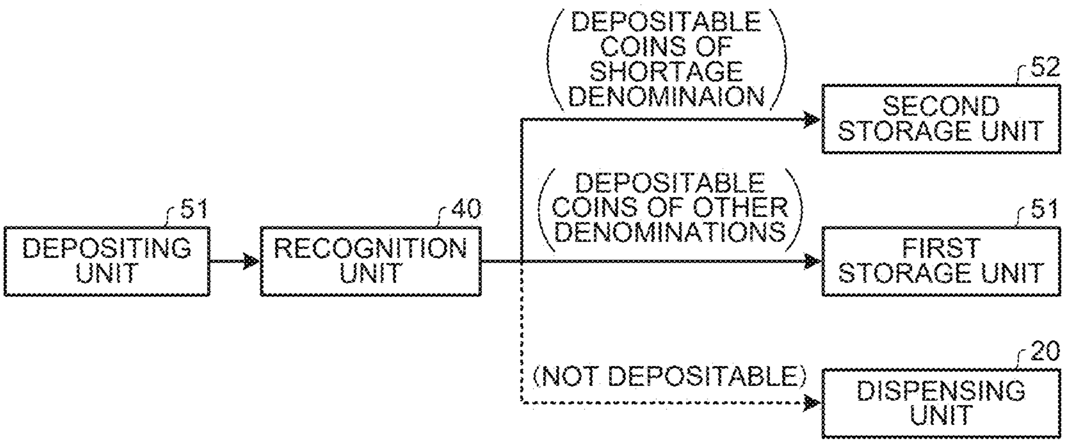

FIRST REPLENISHMENT EXTENSION MODE
(REPLENISHMENT PROCESS, IN THE MIDDLE OF REPLENISHMENT)

FIRST REPLENISHMENT EXTENSION MODE
(REPLENISHMENT PROCESS, AFTER REPLENISHMENT)

DISPENSING EXTENSION MODE
(FIRST MOVING PROCESS)

DISPENSING EXTENSION MODE
(SECOND MOVING PROCESS)

DISPENSING EXTENSION MODE (DEPOSITING PROCESS)

DISPENSING EXTENSION MODE (DISPENSING PROCESS)

FIG.12

SUBSTITUTE REPLENISHMENT SETTING

| COIN FOR REPLENISHMENT | | NUMBER OF COINS FOR REPLENISHMENT BY DENOMINATIONS | | | |
|---|---|---|---|---|---|
| | | ¢1 | ¢5 | ¢10 | ¢25 |
| ¢1 | MINIMUM NUMBER OF CONSTITUENTS | ④ | – | – | – |
| ¢5 | MINIMUM NUMBER OF CONSTITUENTS | – | ① | – | – |
| | SUBSTITUTE REPLENISHMENT 1 | ⑤ | – | – | – |
| ¢10 | MINIMUM NUMBER OF CONSTITUENTS | – | – | ② | – |
| | SUBSTITUTE REPLENISHMENT 1 | – | 2 | 1 | – |
| | SUBSTITUTE REPLENISHMENT 2 | – | ④ | – | – |
| ¢25 | MINIMUM NUMBER OF CONSTITUENTS | – | – | – | ③ |
| | SUBSTITUTE REPLENISHMENT 1 | – | ① | 2 | 2 |
| | SUBSTITUTE REPLENISHMENT 2 | – | – | 5 | 1 |
| | SUBSTITUTE REPLENISHMENT 3 | – | 1 | ⑦ | – |

⇩ (S16) DETERMINE UPPER-LIMIT NUMBER

| SETTING OF UPPER-LIMIT NUMBER OF COINS TO BE STORED IN SECOND STORAGE UNIT | ¢1 | ¢5 | ¢10 | ¢25 |
|---|---|---|---|---|
| | 9 | 6 | 9 | 3 |

MONEY HANDLING APPARATUS AND MONEY HANDLING METHOD

CROSS-REFERENCE TO RELATED APPLICATIONS

The present application is a continuation Ser. No. 18/811,788, filed on Aug. 22, 2024, which claims priority to Japanese patent application no. JP 2023-135687 filed Aug. 23, 2023, the entire contents of each are incorporated herein by reference.

TECHNICAL FIELD

The present disclosure relates to a money handling apparatus for handling money, and a money handling method that the money handling apparatus performs.

BACKGROUND ART

Conventionally, money handling apparatuses for handling money have been used in stores. For example, there is a store that uses a coin handling apparatus to store coins of a plurality of denominations in a mixed state and dispense a change at the time of transaction with a customer. This apparatus includes a change fund storage space that stores a change fund, which is prepared as coins for change is stored, in addition to a storage unit in which a large quantity of coins are stored in a mixed state. The maximum amount of change, which may be dispensed as coins for change in one transaction, is 999 JPY (Japanese yen) since the smallest denomination among Japanese banknotes is 1,000 JPY. Therefore, in the change fund storage space, coins totaling 999 JPY are prepared as the change fund. The coins are selected such that the number of coins is minimized. Specifically, four 1-JPY coins, one 5-JPY coin, four 10-JPY coins, one 50-JPY coin, four 100-JPY coins, and one 500-JPY coin are prepared as the change fund in the change fund space. These denominations and the number of coins for each denomination realize the minimum number of constituent coins for change in Japanese yen. When dispensing coins for change in the transaction, the coin handling apparatus selects and dispenses one or more coins from among the coins in the change fund space according to the amount of a change. The coins are selected from the minimum number of constituent coins for change, whereby the change can be dispensed in a short time, compared to the case where the coin handling apparatus has to find and dispense coins for change from among a large number of coins stored in the storage unit in a mixed state.

SUMMARY

In the aforementioned conventional art, the coin handling apparatus finds the coins constituting the change fund, which is the minimum number of constituent coins totaling 999 JPY, from among the large number of coins stored in the storage unit, and stores in the change fund space in preparation for dispensing of a change. The coins for the change fund are collected from coins fed out from the storage unit. Since the storage unit stores coins of a plurality of denominations in a mixed state, a coin fed out from the storage unit may not be a coin constituting the change fund. The coin handling apparatus repeats a process of recognizing the denomination of each coin fed out from the storage unit, and storing a coin to be used for the change fund into the change fund storage space while returning other coins to the storage unit, whereby coins of predetermined denominations are prepared by a predetermined number for each denomination. Depending on the denominations and the number for each denomination of the coins stored in the storage unit, preparation of the change fund may take a long time, or the change fund cannot be prepared.

The present disclosure has been made in view of the above problem of the conventional art. The present disclosure addresses the problem, as discussed herein, with a money handling apparatus and a money handling method capable of efficiently preparing money for dispensing, in a predetermined storage unit in the money handling apparatus.

A money handling apparatus according to one aspect of the present disclosure includes: a first storage unit and a second storage unit configured to store money therein; a transport unit configured to transport money; a recognition unit configured to recognize the money being transported by the transport unit; and a control unit configured to transport the money in the first storage unit by using the transport unit, recognize the money by using the recognition unit, transport a part of the money having been stored in the first storage unit to the second storage unit based on a result of recognition, so that the second storage unit stores money of predetermined denominations for which a quantity of money of each denomination is set in advance. The control unit detects a shortage denomination for which the quantity of money currently stored in the first storage unit is short, and allows to store, into the second storage unit, money of the shortage denomination larger in quantity than the quantity set in advance for the shortage denomination.

The objects, features, advantages, and technical and industrial significance of this disclosure will be better understood by the following description and the accompanying drawings of the disclosure.

BRIEF DESCRIPTION OF THE DRAWINGS

FIG. 1 illustrates an outline of a coin handling apparatus according to an embodiment of the present disclosure;

FIG. 5 illustrates an operation of the coin handling apparatus in a depositing extension mode;

FIG. 12 illustrates an example of substitute replenishment; and

DESCRIPTION OF EMBODIMENTS

Figure 2:
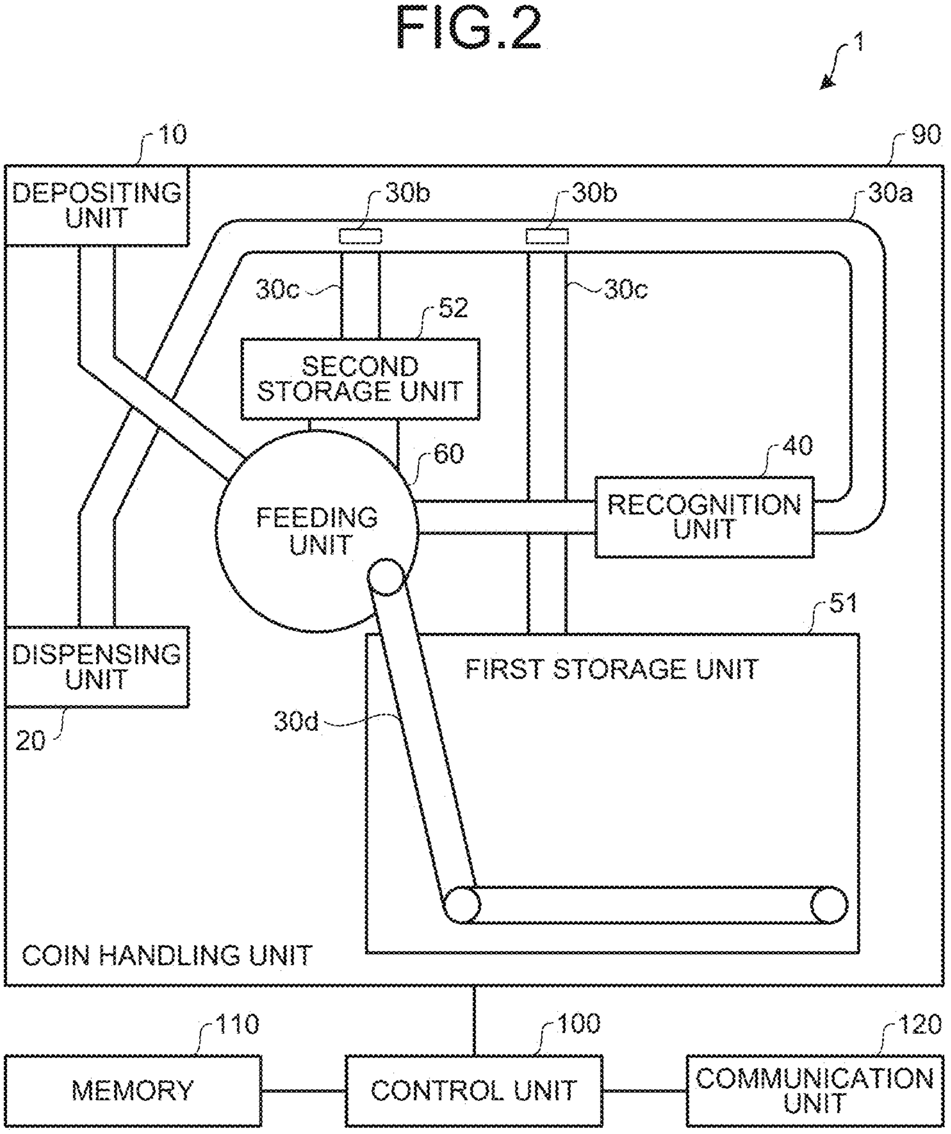
FIG. 2 is a schematic diagram showing a configuration example of the coin handling apparatus shown in FIG. 1.

Hereinafter, an embodiment of a money handling apparatus and a money handling method according to the present disclosure will be described with reference to the drawings. Money to be handled by the money handling apparatus may be banknotes, coins, or both banknotes and coins. In this embodiment, coins will be described as an example. As to banknotes, the money handling apparatus may handle banknotes as described below by a method suitable for banknotes.

FIG. 1 illustrates an outline of a coin handling apparatus (money handling apparatus) 1 according to the present embodiment. The coin handling apparatus 1 includes a depositing unit 10, a dispensing unit 20, a transport unit 30, a recognition unit 40, a first storage unit 51, and a second storage unit 52.

The installation place of the coin handling apparatus 1 is not particularly limited. Hereinafter, the description will be continued for the case where the coin handling apparatus 1 is installed together with a banknote handling apparatus in a store, where transactions with customers are performed. The coin handling apparatus 1 is used for settling the transaction amount between the store and each customer.

The transaction amount between the store and the customer is determined by using, for example, a cash register installed at a checkout counter in the store. The coin handling apparatus 1 performs a depositing process for coins deposited by the customer to pay for the transaction amount (A). If a banknote is included in cash that the customer pays, the customer deposits coins into the coin handling apparatus 1, and deposits banknotes into the banknote handling apparatus installed adjacent to the coin handling apparatus 1. The coin handling apparatus 1 and the banknote handling apparatus may not necessarily be separate apparatuses, and may be integrated with each other.

As shown in FIG. 1, the coin handling apparatus 1 receives coins that the customer pays, at the depositing unit 10 (A1). The depositing unit 10 can simultaneously receive a plurality of coins at one time. The coins received in the depositing unit 10 are fed out one by one to the transport unit 30 in the coin handling apparatus 1. The transport unit 30 transports each coin fed into inside the apparatus, as shown by arrows in FIG. 1.

The coins are transported from the depositing unit 10 to the recognition unit 40 (A2). The recognition unit 40 recognizes the denomination of each coin. The recognition unit 40 may recognize authenticity and fitness of each coin. The configuration of the recognition unit 40 is not particularly limited. For example, the recognition unit 40 is configured to include at least one of a magnetic sensor, and an optical sensor such as a line sensor, a camera, etc. The transport unit 30 transports the coins along transport paths provided in the apparatus, based on the recognition result of the recognition unit 40.

The transport unit 30 transports coins that can be deposited in the apparatus, to the first storage unit 51 (A3). The first storage unit 51 stores the coins transported by the transport unit 30. The coin handling apparatus 1 uses the first storage unit 51 for storage of coins deposited during the depositing process. The first storage unit 51 stores coins of a plurality of denominations in a mixed state.

The first storage unit 51 can perform storage and feeding of coins. Likewise, the second storage unit 52 can perform storage and feeding of coins. The coins transported by the transport unit 30 can be stored in the first storage unit 51 or the second storage unit 52. The coins fed out from the first storage unit 51 and the coins fed out from the second storage unit 52 are transported by the transport unit 30. The second storage unit 52 will be described later.

The first storage unit 51 store coins in a mixed state. The second storage unit 52 also stores coins in a mixed state. In this embodiment, the "mixed state" indicates a state where coins of a plurality of denominations are mixed together in one storage unit, and the denomination of a coin to be fed out next from this storage unit cannot be specified among the denominations of the coins being stored.

The transport unit 30 transports a reject coin, which has been recognized by the recognition unit 40 and determined not to be deposited, to the dispensing unit 20 to reject this coin (A4). The rejected coin is returned to the customer from the dispensing unit 20. For example, a coin that has not been recognized to be a genuine coin, and a coin that is a genuine coin but the denomination is not included in target denominations to be handled by the coin handling apparatus 1, are rejected from the dispensing unit 20.

Based on the recognition result of the recognition unit 40, the coin handling apparatus 1 calculates the deposit amount of the coins stored in the first storage unit 51. If the customer pays a banknote in addition to coins and thereby a depositing process for this banknote is performed in the banknote handling apparatus, the deposit amount is the sum of the deposit amount of the banknote obtained in the banknote handling apparatus and the deposit amount of the coins obtained in the coin handling apparatus 1.

The coin handling apparatus 1 stores, in a memory, the denominations and the number for each denomination of the coins stored in the first storage unit 51 during the depositing process. The memory stores inventory amount information of the coin handling apparatus 1. The inventory amount information includes: the denominations and the number for each denomination of the coins currently stored in the first storage unit 51; and the denominations and the number for each denomination of the coins currently stored in the second storage unit 52. The inventory amount information is not limited to be stored inside the coin handling apparatus 1, and may be stored in an external device connected to the coin handling apparatus 1.

The coin handling apparatus 1 performs a dispensing process of dispensing a change to be returned to the customer (B). If the deposit amount exceeds the transaction amount between the store and the customer, the dispensing process of returning a change to the customer is performed. If the change includes a banknote, the banknote is dispensed from the banknote handling apparatus while coins are dispensed from the coin handling apparatus 1.

The coin handling apparatus 1 performs the dispensing process by calculating the amount of the change in coins, based on the transaction amount acquired from the external device and the deposit amount calculated after recognizing the deposited coins. The coin handling apparatus 1 performs the dispensing process based on the amount of the change, the inventory amount information, and setting information regarding change dispensing.

The change dispensing process is performed by using coins currently stored in the second storage unit 52. The coin handling apparatus 1 uses the second storage unit 52 for storing coins to be dispensed during the dispensing process. At least the minimum number of constituent coins constituting a change are stored in the second storage unit 52 in advance. The "minimum number of constituent coins" described in this embodiment refers to a combination of the minimum number of coins of a plurality of denominations, of which the total amount is the maximum monetary amount of a change that may be dispensed through coins from the coin handling apparatus 1 in one transaction. For example, in the case of Japanese coins, four 1-JPY coins, one 5-JPY coin, four 10-JPY coins, one 50-JPY coin, four 100-JPY coins, and one 500-JPY coin, i.e., fifteen coins equivalent to 999 JPY in total, are the minimum number of constituent coins. Before dispensing coins for change to be returned to the customer, the coin handling apparatus 1 prepares coins in the second storage unit 52 such that the coins being stored in the second storage unit 52 includes the minimum number of constituent coins. The coins for change have been already stored therein before starting the depositing process of coins paid by the customer, for example.

The coin handling apparatus 1 having started the dispensing process feeds out coins from the second storage unit 52. The fed-out coins are transported to the recognition unit 40 by the transport unit 30 (B1). The recognition unit 40 recognizes the denominations of the coins. The recognition unit 40 may recognize authenticity and fitness of each coin.

Since the second storage unit 52 stores coins of a plurality of denominations in a mixed state and feeds out the coins at random, a coin not to be used for the change may be fed out from the storage unit 52. Based on the recognition result of the recognition unit 40, the transport unit 30 transports a coin to be included in the change to the dispensing unit 20 (B2), and transports a coin not to be included in the change to the second storage unit 52 (B3). The coin handling apparatus 1 continues the process of transporting only the coin constituting the change to the dispensing unit 20 while returning the other coin to the second storage unit 52, whereby coins equivalent to the change amount are discharged from the dispensing unit 20 to the outside of the apparatus, and are returned to the customer.

For example in the dispensing process of returning three 1-JPY coins to the customer because the change amount is 3 JPY, if a coin fed out from the second storage unit 52 is a 1-JPY coin, this coin is dispensed from the dispensing unit 20, until three 1-JPY coins are dispensed from the dispensing unit 20. If the fed-out coin is not a 1-JPY coin, this coin is returned to the second storage unit 52. Until three 1-JPY coins are dispensed from the dispensing unit 20, the process of recognizing coins fed out from the second storage unit 52 one by one with the recognition unit 40, and transporting each coin to the dispensing unit 20 or the second storage unit 52 based on the recognition result, is repeated. The coin handling apparatus 1, which has ended the dispensing process, updates the inventory amount information of the second storage unit 52, based on the denominations and the number for each denomination of the coins dispensed from the second storage unit 52 to the outside of the apparatus. The coin handling apparatus 1 notifies an external device, such as a cash register, that settlement of the transaction amount has been completed. As to the change amount, calculation of the change amount is not necessarily performed in the coin handling apparatus 1, and may be performed in an external device. For example, the coin handling apparatus 1 may calculate the deposit amount and output the deposit amount to the cash register, and the cash register may calculate the change amount from the transaction amount and the deposit amount. In this case, the coin handling apparatus 1 may perform the dispensing process, with information indicating the change amount acquired from the cash register.

After the dispensing process of the coins for change, the coin handling apparatus 1 performs a replenishment process of replenishing the second storage unit 52 with coins (C). The coin handling apparatus 1 feeds out coins for replenishment from the first storage unit 51. The fed-out coins are transported to the recognition unit 40 by the transport unit 30 (C1). The recognition unit 40 recognizes the denominations of the coins. The recognition unit 40 may recognize authenticity and fitness of each coin.

Since the first storage unit 51 stores coins of a plurality of denominations in a mixed state and feeds out the coins at random, a coin not to be used for the replenishment may be fed out from the first storage unit 51. Based on the recognition result of the recognition unit 40, the transport unit 30 transports coins for replenishment to the second storage unit 52 (C2), and transports coins not for replenishment to the first storage unit 51 (C3). The coin handling apparatus 1 continues the process of transporting only the coins for replenishment to the second storage unit 52 while returning the other coins to the first storage unit 51, thereby replenishing the second storage unit 52 with coins. The coins for replenishment are coins of one or more denominations with which the second storage unit 52 needs to be replenished.

For example, when three 1-JPY coins and two 10-JPY coins are dispensed as a change from the second storage unit 52, three 1-JPY coins and two 10-JPY coins corresponding to a decrease due to dispensing are set as coins for replenishment. After dispensing the change, the second storage unit 52 is replenished with three 1-JPY coins and two 10-JPY coins obtained from the first storage unit 51, whereby the second storage unit 52 is returned to the state where the minimum number of constituent coins are being stored.

Specifically, after starting the replenishment process, a coin fed out from the first storage unit 51 is stored in the second storage unit 52 if this coin is a 1-JPY coin or a 10-JPY coin for replenishment, until the second storage unit 52 is replenished with three 1-JPY coins and two 10-JPY coins for replenishment. If a fed-out coin is a coin other than a 1-JPY coin and a 10-JPY coin, i.e., a coin not for replenishment, this coin is returned to the first storage unit 51. Until the second storage unit 52 is replenished with three 1-JPY coins and two 10-JPY coins for replenishment, the process of recognizing the coins fed out from the first storage unit 51 one by one with the recognition unit 40, and transporting each coin to the first storage unit 51 or the second storage unit 52 based on the recognition result, is repeated. The coin handling apparatus 1, which has ended the replenishment process, updates the inventory amount information of the first storage unit 51 and the inventory amount information of the second storage unit 52, based on the denominations and the number for each denomination of the coins that are moved from the first storage unit 51 to the second storage unit 52 during the replenishment process.

As described above, the coin handling apparatus 1 stores deposited coins into the first storage unit 51, dispenses coins fed out from the second storage unit 52 as a change, and replenishes the second storage unit 52 with coins obtained from the first storage unit 51. The second storage unit 52 is replenished with the same coins as that decreased due to the dispensing process. The coin handling apparatus 1 performs the depositing process, the dispensing process, and the replenishment process as one set of processes. Therefore, before starting the depositing process, the coin handling apparatus 1 has already set the second storage unit 52 in the state where the minimum number of constituent coins for change are being stored therein.

For example, the first storage unit 51 is configured to store a large number of coins so as to be able to perform a plurality of times of depositing processes. Meanwhile, the second storage unit 52 only needs to perform a single change dispensing process, and therefore can be miniaturized compared to the first storage unit 51. For example, the first storage unit 51 may be configured to store 1000 or more coins, while the second storage unit 52 may be configured to store about 50 coins.

Each of the aforementioned depositing process, dispensing process, and replenishment process is performed in a normal mode. The coin handling apparatus 1 can change the operation mode from the normal mode to an extension mode. The coin handling apparatus 1 according to the present embodiment has one feature in that the operation mode is changed to the extension mode, based on the inventory amount information of the first storage unit 51, thereby changing the number of coins to be stored in the second storage unit 52 (D).

Specifically, upon detecting a shortage denomination for which the number of coins in the first storage unit 51 is short, the coin handling apparatus 1 changes the operation mode to the extension mode. In the extension mode, the coin handling apparatus 1 stores coins of the shortage denomination larger in number than the minimum number of constituent coins, into the second storage unit 52. That is, by changing the operation mode to the extension mode, the coin handling apparatus 1 allows the second storage unit 52 to store more coins of the shortage denomination, which is short in the first storage unit 51, than usual in the normal mode. The coin handling apparatus 1 secures coins of the shortage denomination in the second storage unit 52 by storing therein the larger number of coins of the shortage denomination than usual. It prevents the coin handling apparatus 1 from a lengthy replenishment process that takes a long time because the number of coins for replenishing the second storage unit 52 is small in the first storage unit 51 and the coins for replenishment cannot be fed out from the first storage unit 51 for a long time.

The extension mode includes a depositing extension mode, a replenishment extension mode, and a dispensing extension mode. The replenishment extension mode includes a first replenishment extension mode and a second replenishment extension mode. In order to clarify a difference between the normal mode and the extension mode, movement of coins in the normal mode will be described first with a specific example of the coin handling apparatus 1, and thereafter, the extension mode will be described.

FIG. 2 is a schematic diagram showing a configuration example of the coin handling apparatus 1 shown in FIG. 1. The coin handling apparatus 1 shown in FIG. 2 includes a coin handling unit 90, a control unit 100, a memory 110, and a communication unit 120. The coin handling unit 90 shown in FIG. 2 includes a feeding unit 60 in addition to the configuration shown in FIG. 1. The feeding unit 60 can receive a plurality of coins from each of the depositing unit 10, the second storage unit 52 and a lower transport unit 30*d*, store the received coins, and feed out the stored coins one by one to an upper transport unit 30*a*. The feeding unit 60 has been conventionally known. For example, a rotary disk type feeding unit may be used as the feeding unit 60. The rotary disk type feeding unit rotates, in a tilted state, a disk having projections on its outer peripheral surface, catches coins by the projections, transports the coins upward with the rotation of the disk, thereby feeding out the coins one by one to the upper transport unit 30*a*.

The transport unit 30 shown in FIG. 2 includes the upper transport unit 30*a*, a plurality of gates 30*b*, a plurality of chutes 30*c* corresponding to the respective gates 30*b*, and the lower transport unit 30*d*. The upper transport unit 30*a* can transport coins fed out one by one from the feeding unit 60 and passed the recognition unit 40 and the gates 30*b*, to the dispensing unit 20. The chutes 30*c* connect the gates 30*b* disposed in the upper transport unit 30*a* to the first storage unit 51 and the second storage unit 52 in one-to-one correspondence.

For example, the upper transport unit 30*a* transports a coin in a state where at least a part of one side of the coin is in contact with the transport surface of the transport path. A belt, which is opposed to the transport surface with the coin between them, has a plurality of projections. A drive unit drives the belt and moves the projections in the transport direction. A projection contacts with a rear edge part, in the transport direction, of the coin on the transport path. The coin is pushed by the projection and transported along the transport path. Each gate 30*b* is openable and closable so as to be flush with the transport surface when being closed. The gate 30*b* is usually closed. The upper transport unit 30*a* opens the gate 30*b* corresponding to the first storage unit 51 to cause a coin to be dropped into the chute 30*c* and stored in the first storage unit 51. Likewise, the upper transport unit 30*a* opens the gate 30*b* corresponding to the second storage unit 52 to cause a coin to be dropped into the chute 30*c* and stored in the second storage unit 52. The transport of a coin performed by the transport unit 30 may include transport due to free fall of the coin.

The lower transport unit 30*d* transports the coins stored in the first storage unit 51 to the feeding unit 60 located above the first storage unit 51. The first storage unit 51 is configured to include a part of the lower transport unit 30*d*. Specifically, a part of the lower transport unit 30*d* forms a part of a bottom surface of a storage space in the first storage unit 51. The lower transport unit 30*d* transports the coins stored in the first storage unit 51, in the horizontal direction, and thereafter transports the coins in the diagonally upward direction toward the feeding unit 60. For example, the lower transport unit 30*d* has a belt conveyer type transport mechanism that transports coins on a belt. Although the upper transport unit 30*a* transports the coins one by one, the lower transport unit 30*d* may transport a plurality of coins on the belt simultaneously. For example, a few coins on the belt may be simultaneously transported and dropped into the feeding unit 60. The dropped coins are temporarily stored in the feeding unit 60. The coins in the feeding unit 60 are fed out one by one to the upper transport unit 30*a*.

The second storage unit 52 is disposed above the feeding unit 60. The second storage unit 52 has a gate at a bottom surface forming a storage space. The second storage unit 52 stores coins therein with the gate being closed. When the gate is opened, all the coins stored in the second storage unit 52 are dropped and stored in the storage space of the feeding unit 60.

The control unit 100 controls the functions and operations of the components constituting the coin handling unit 90. The control unit 100 can control the components, based on user operations performed on the components, information received from an external device via the communication unit 120, and the like, with reference to various kinds of information stored in the memory 110 or a dedicated memory. For example, a program corresponding to the control unit 100 is stored in the memory in advance. The functions and operations of the control unit 100 are realized by hardware such as a CPU executing the program. The functions and operations of the coin handling apparatus 1 according to the present embodiment are realized by the control unit 100. According to the exemplary embodiment, the control unit 100 is, for example, one or more general purpose processing circuits such as a microprocessor, a microcontroller, and a digital signal processor, or a dedicated processing circuit such as an ASIC (Application Specific Integrated Circuit).

The memory 110 is a non-volatile storage device in which various kinds of information required for the operations of the control unit 100 are stored. The information stored in the memory 110 includes inventory amount information of the first storage unit 51, inventory amount information of the second storage unit 52, and setting information regarding the money handling modes.

The communication unit 120 is used for transmitting/receiving information to/from an external device. Examples of the external device include a cash register connected to and used with the coin handling apparatus 1. The control unit 100 can receive a settlement instruction from the external device via the communication unit 120, and transmit a notification of settlement completion to the external device. Furthermore, the control unit 100 can transmit/receive information indicating a deposit amount and/or information indicating a change amount to/from the external device via the communication unit 120.

The control unit 100 controls the coin handling unit 90, based on at least one of the information stored in the memory 110 and the information transmitted/received through the communication unit 120, whereby the coin handling described in the present embodiment is realized. In the present embodiment, the processes described to be performed by the coin handling apparatus 1 are realized by the control of the control unit 100.

Figure 3A:
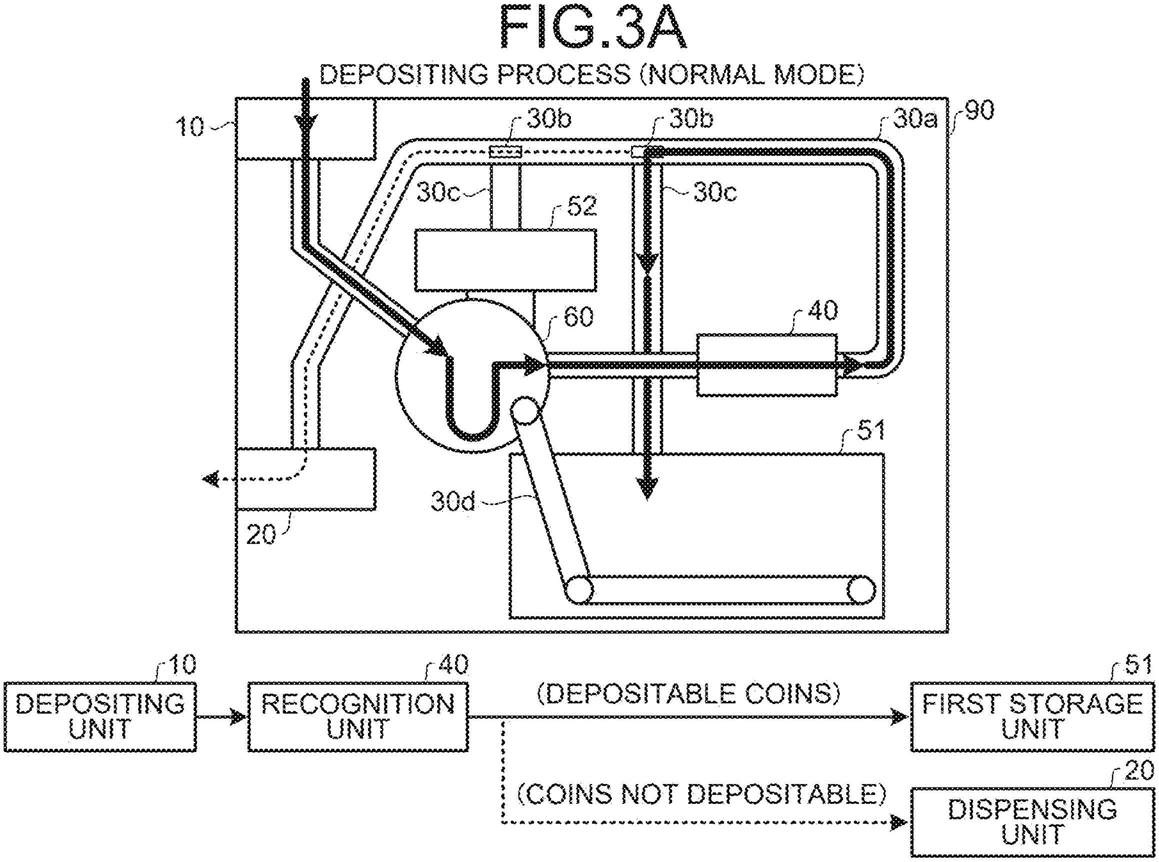
FIGS. 3A and 3B illustrate a depositing process and a dispensing process in a normal mode.
Figure 3B:
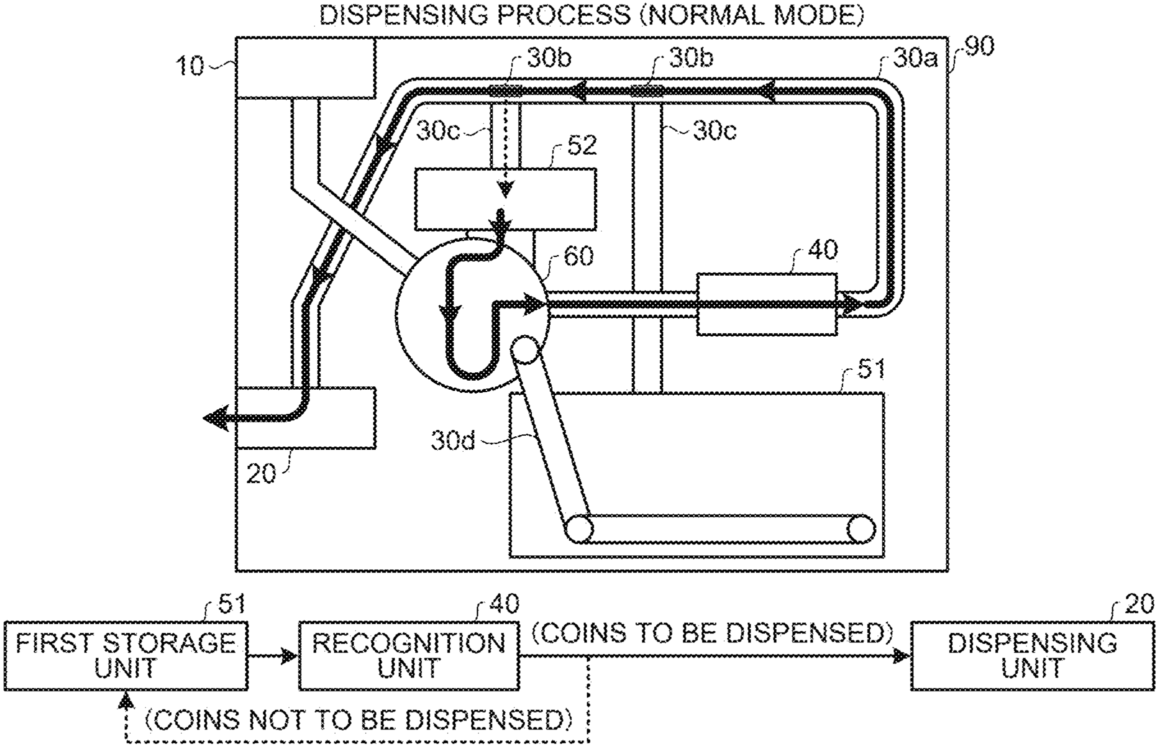

FIGS. 3A and 3B illustrate a depositing process and a dispensing process in the normal mode. FIG. 3A illustrates the depositing process, and FIG. 3B illustrates the dispensing process. In each of the figures from FIG. 3A to FIG. 9B, an upper part indicates movement of coins with arrows by using the configuration of the coin handling unit 90 shown in FIG. 2, and a lower part indicates movement of coins by using a block diagram shown in FIG. 1. The configuration of the coin handling unit 90 is not particularly limited as long as the coins can be handled as shown in the block diagram, and the coin handling unit 90 may have a configuration different from that shown in FIG. 2.

FIG. 3A shows the depositing process in the normal mode. One or more coins received in the depositing unit 10 are dropped into the feeding unit 60. The feeding unit 60 feeds out the coins received from the depositing unit 10, one by one, to the upper transport unit 30*a*. The coins being transported by the upper transport unit 30*a* are recognized by the recognition unit 40. Based on the recognition result, a coin that can be deposited is dropped from the gate 30*b* into the chute 30*c*, and is stored in the first storage unit 51. Meanwhile, a coin that cannot be deposited is rejected from the dispensing unit 20 as shown by a broken-line arrow in FIG. 3A, and is returned to the customer. All the coins received in the depositing unit 10 are each either rejected from the dispensing unit 20 or stored in the first storage unit 51, thereby completing the depositing process.

FIG. 3B shows the dispensing process in the normal mode. The second storage unit 52 stores a plurality of coins in a mixed state. In the dispensing process, the gate at the bottom surface of the second storage unit 52 is opened, and all the coins stored in the second storage unit 52 are dropped into the feeding unit 60. After all the coins have been almost simultaneously discharged from the gate of the second storage unit 52 and dropped into the feeding unit 60, the gate is closed and the second storage unit 52 is returned to a state where the coin can be stored therein again. The feeding unit 60 feeds out the coins received from the second storage unit 52 one by one to the upper transport unit 30*a*. The coins being transported by the upper transport unit 30*a* are recognized by the recognition unit 40. Based on the recognition result, a coin to be dispensed, i.e., a coin constituting a change, is discharged from the dispensing unit 20 to the outside of the apparatus. A coin not to be dispensed is dropped from the gate 30*b* into the chute 30*c*, and is returned to the second storage unit 52, as shown by a broken-line arrow in FIG. 3B. Among the coins dropped from the second storage unit 52 into the feeding unit 60, coins equivalent to the change amount are dispensed from the dispensing unit 20 while the other coins are returned to the second storage unit 52, thereby completing the dispensing process.

Figure 4A:
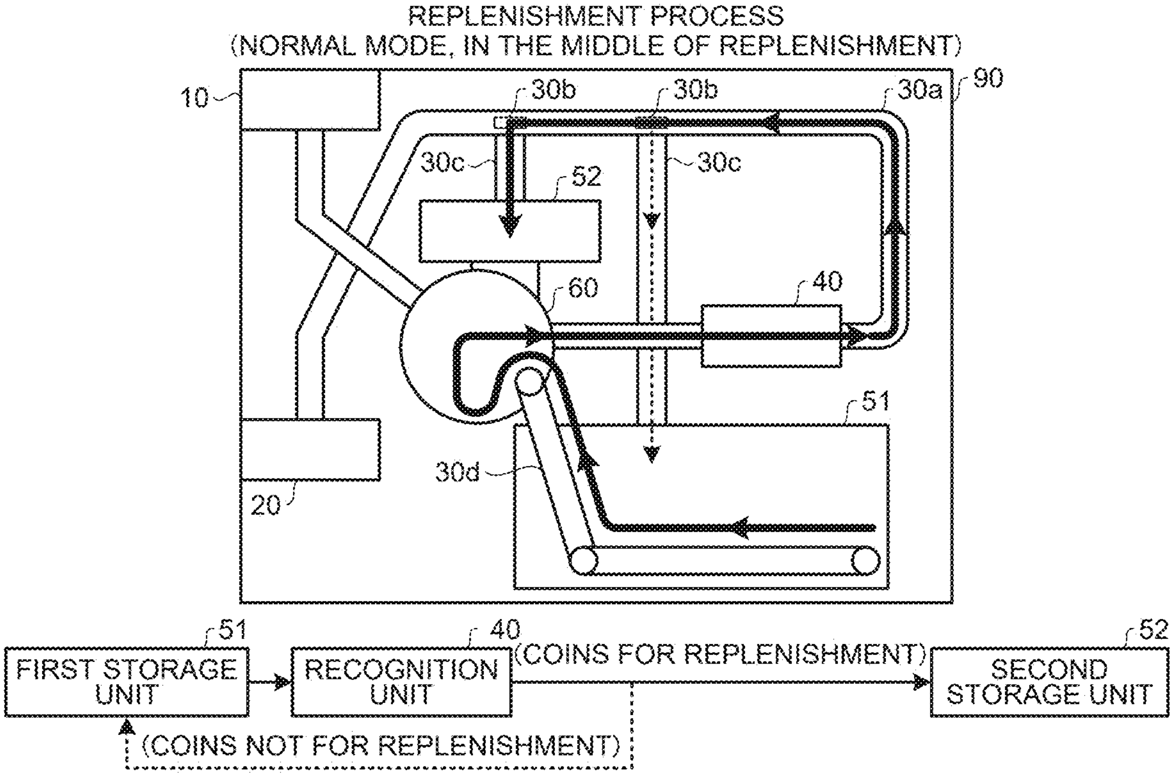
FIGS. 4A and 4B illustrate a replenishment process in a normal mode.
Figure 4B:
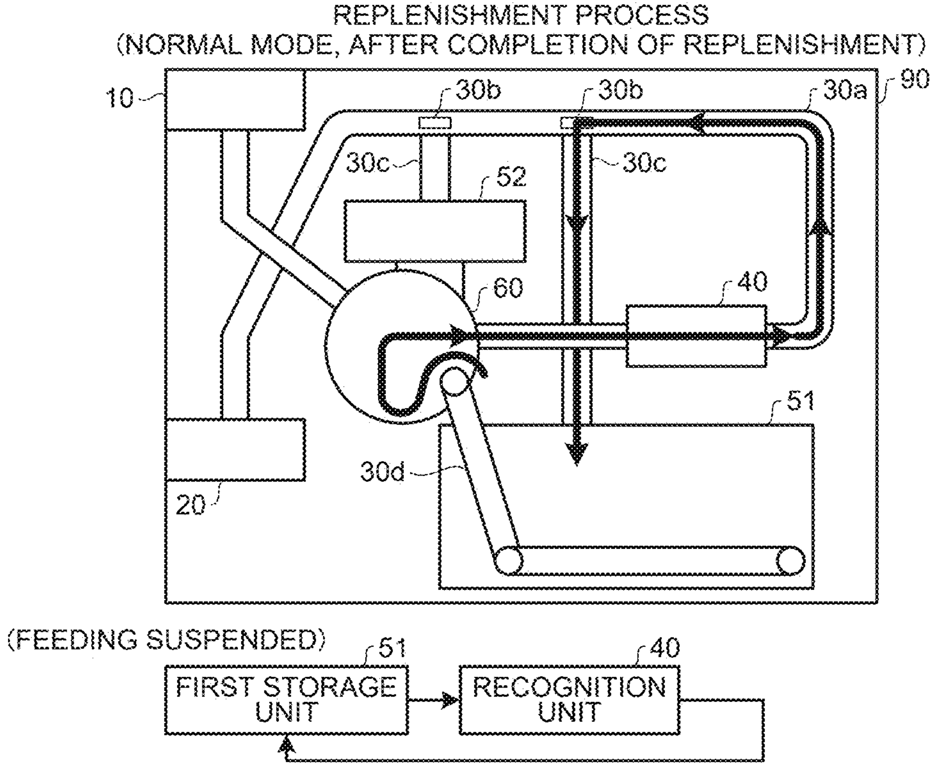

FIGS. 4A and 4B illustrate the replenishment process in the normal mode. FIG. 4A shows movement of coins while the second storage unit 52 is being replenished with coins, and FIG. 4B shows movement of coins after the second storage unit 52 has been replenished with coins.

As shown in FIG. 4A, the coins stored in the first storage unit 51 are transported to the feeding unit 60 by the lower transport unit 30*d*. For example, the lower transport unit 30*d* transports about ten coins from the first storage unit 51 to the feeding unit 60 per second. The feeding unit 60 feeds out the coins received from the first storage unit 51 one by one to the upper transport unit 30*a*. The coins being transported by the upper transport unit 30*a* are recognized by the recognition unit 40. Based on the recognition result, a coin for replenishment is stored in the second storage unit 52. A coin not for replenishment is dropped from the gate 30*b* into the chute 30*c*, and is returned to the first storage unit 51 as shown by a broken-line arrow in FIG. 4A.

The coin handling apparatus 1 repeats the operation of storing a coin for replenishment into the second storage unit 52 and returning a coin not for replenishment to the first storage unit 51, among the coins fed out from the first storage unit 51, as shown in FIG. 4A, thereby replenishing the second storage unit 52 with coins. When replenishment of the second storage unit 52 with coins has been completed, the lower transport unit 30*d* suspends transport of coins from the first storage unit 51 to the feeding unit 60. Thereafter, as shown in FIG. 4B, the coin handling apparatus 1 returns coins, which are being transported by the upper transport unit 30*a* at the time when replenishment of the second storage unit 52 with coins has been completed, to the first storage unit 51. The coins are dropped from the gate 30*b* to the first storage unit 51 through the chute. Also, coins remaining in the feeding unit 60 are fed out to the upper transport unit 30*a*, and are returned from the gate 30*b* to the first storage unit 51 through the chute 30*c*. Among the coins fed out from the first storage unit 51, coins for replenishment are stored in the second storage unit 52 while the other coins are returned to the first storage unit 51, thereby completing the replenishment process.

After dispensing the change from the second storage unit 52, a replenishment process of feeding out one or more coins for replenishment from the first storage unit 51, and replenishing the second storage unit 52 with the coins, is performed based on the denominations and the number for each denomination of the coins used for the change.

Coins are fed out from the first storage unit 51 until the coins for replenishment are obtained from these coins fed out from the first storage unit 51. It may take a long time until the coins for replenishment are fed out, depending on the storage state in the first storage unit 51. For example, if only 50 coins of a denomination for replenishment are included in 1000 coins stored in the first storage unit 51, it takes time before completing the replenishment, compared to the case where 500 coins of this denomination are included in 1000 coins of the first storage unit 51.

The coin handling apparatus 1 determines whether the operation mode is to be changed or not based on the inventory amount information of the first storage unit 51, i.e., the denominations and the number for each denomination of the coins currently stored in the first storage unit 51. When the number of coins of a denomination for replenishment satisfies a predetermined condition, the coin handling apparatus 1 determines this denomination to be a shortage denomination, and switches the operation mode from the normal mode to the extension mode. A condition for switching the operation mode is prepared in the memory 110 in advance. For example, when the ratio of the number of coins of a denomination for replenishment to the number of coins currently stored in the first storage unit 51, i.e., the total number of coins of all denominations, is lower than a predetermined threshold value, this denomination is determined as the shortage denomination. The condition for switching the operation mode will be described later.

When such a shortage denomination has been found, i.e., the shortage of coin of the denomination for replenishment occurred in the first storage unit 51 and the denomination is determined as the shortage denomination, the coin handling apparatus 1 can perform the depositing process in the depositing extension mode. FIG. 5 shows the operation of the coin handling apparatus 1 in the depositing extension mode. In the depositing extension mode, the process of receiving deposited coins from the depositing unit 10 into the feeding unit 60, feeding out the coins to the upper transport unit 30*a*, and recognizing the coins by the recognition unit 40, is performed in the same way as that of the depositing process in the normal mode shown in FIG. 3A. Also, reject coins are handled in the same way as that of the depositing process in the normal mode.

There is a difference in the way of handling coins of a shortage denomination among deposited coins, between the depositing extension mode and the normal mode. In the normal mode, all the coins that can be deposited are stored in the first storage unit 51, regardless of the denominations thereof. Meanwhile, in the extension mode, as shown in FIG. 5, among the coins that can be deposited, coins of the shortage denomination are stored in the second storage unit 52, and coins of denominations other than the shortage denomination are stored in the first storage unit 51.

Thus, the coin handling apparatus 1 stores the coins of the shortage denomination, which may cause a lengthy replenishment process that takes a long time to replenish the second storage unit 52 with coins fed out from the first storage unit 51, into the second storage unit 52 from the stage of the depositing process, thereby avoiding the time required for the replenishment process from increasing.

After the operation mode of the coin handling apparatus 1 is switched to the extension mode, coins of the shortage denomination larger in number than the minimum number of constituent coins may be stored in the second storage unit 52. For example, although the minimum number of 100-JPY coins constituting a change by Japanese coins is four, if it is detected that 100-JPY coin becomes a shortage denomination and the depositing process is performed in the depositing extension mode, the coin handling apparatus 1 can store five or more 100-JPY coins in the second storage unit 52.

When a shortage denomination has been found in the first storage unit 51, the coin handling apparatus 1 can perform the replenishment process with the operation mode being switched from the normal mode to the extension mode. The extension mode of the replenishment process includes two types of extension modes, a first replenishment extension mode and a second replenishment extension mode. The coin handling apparatus 1 can select at least one of the first replenishment extension mode and the second replenishment extension mode, according to a state of coins of the shortage denomination in the first storage unit 51, to perform the replenishment process.

Figure 6A:
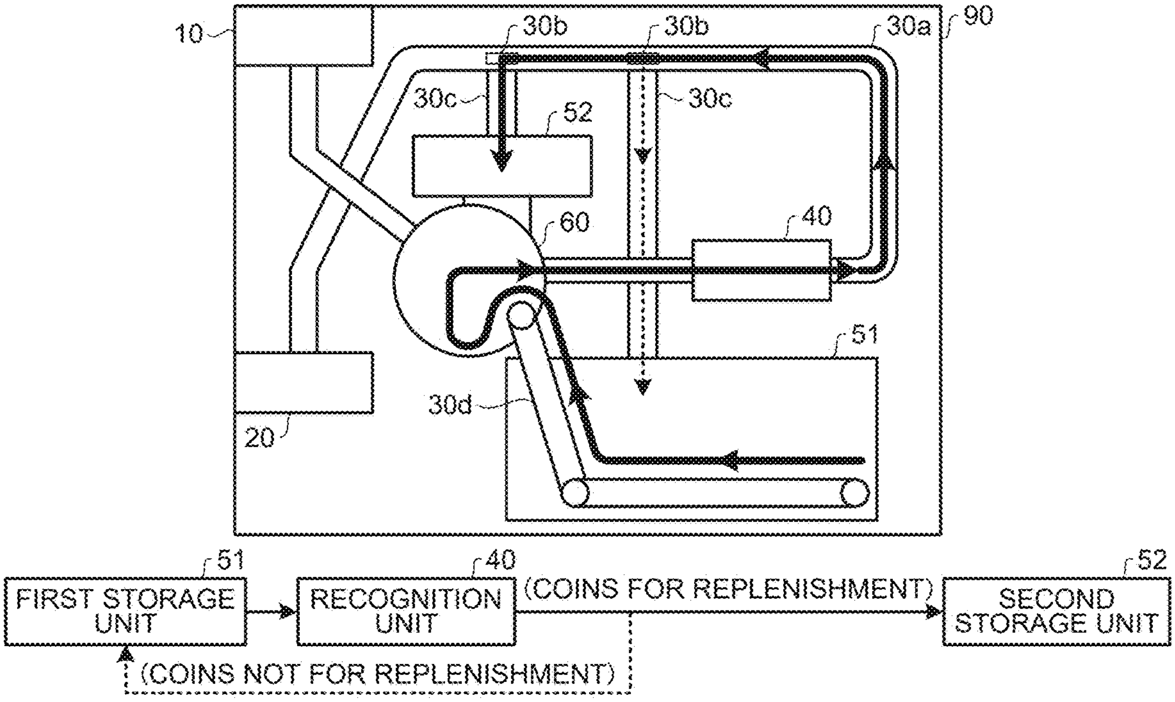
FIGS. 6A and 6B illustrate an operation of the coin handling apparatus in a first replenishment extension mode.
Figure 6B:
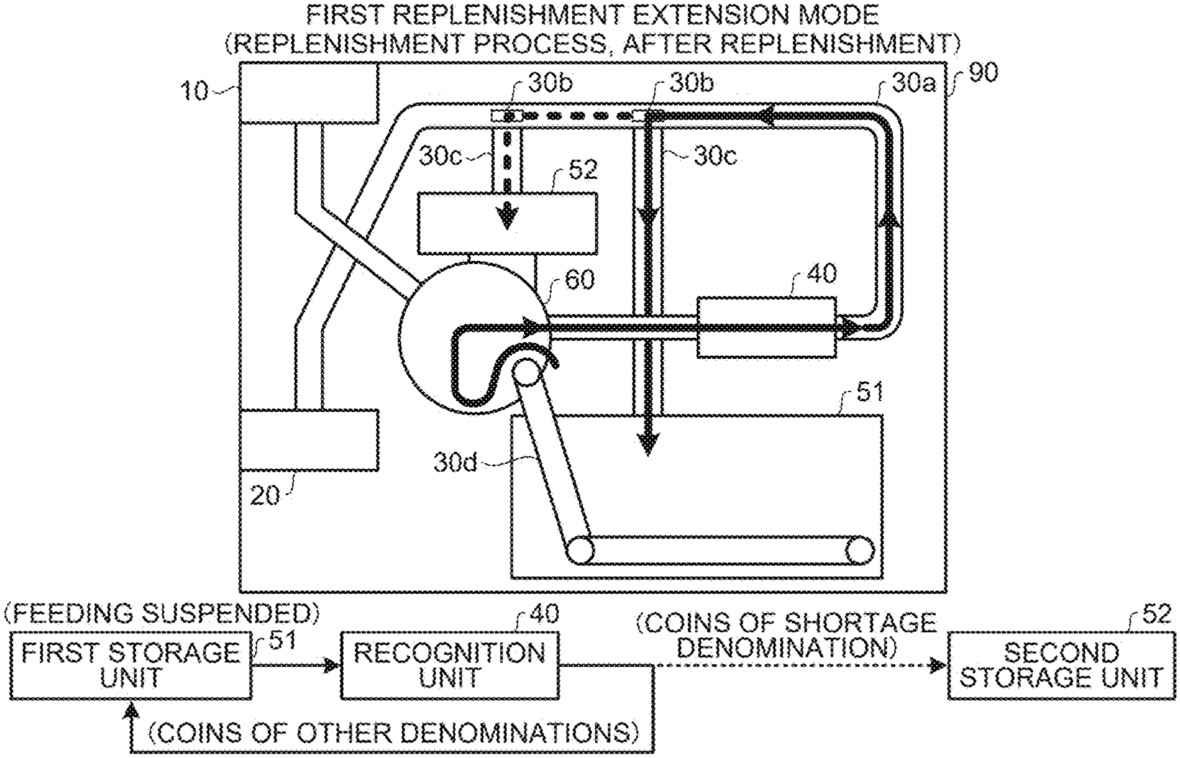

FIGS. 6A and 6B illustrate the operation of the coin handling apparatus 1 in the first replenishment extension mode. When a shortage denomination has been found, the coin handling apparatus 1 can perform the replenishment process in the first replenishment extension mode shown in FIGS. 6A and 6B. As shown in FIG. 6A, the process during a period from when the replenishment process is started in the first replenishment extension mode to when the second storage unit 52 is replenished with coins for replenishment is performed in the same way as that of the replenishment process in the normal mode shown in FIG. 4A.

In the replenishment process of the normal mode, after replenishing the second storage unit 52 with coins for replenishment, all the coins remaining in the transport path and the feeding unit 60 are returned to the first storage unit 51 as shown in FIG. 4B. Meanwhile, in the replenishment process of the first replenishment extension mode, after replenishing the second storage unit 52 with coins for replenishment, if a coin of the shortage denomination is included in the coins remaining in the transport path and the feeding unit 60, this coin is stored in the second storage unit 52 as shown by a broken-line arrow in FIG. 6B. The coins other than the shortage denomination are returned to the first storage unit 51 in the same way as that of the normal mode.

For example, in a case where 10-JPY is a shortage denomination and the replenishment process is started in the first replenishment extension mode to replenish the second storage unit 52 with three 1-JPY coins and two 10-JPY coins (five coins for replenishment in total), all the five coins for replenishment are stored in the second storage unit 52, and thereafter, 10-JPY coins of the shortage denomination existing in the transport path and the feeding unit 60 are transported to and stored in the second storage unit 52. Specifically, 10-JPY coins, which have been recognized by the recognition unit 40 and are currently transported by the upper transport unit 30*a*, are stored in the second storage unit 52. Also, coins remaining in the feeding unit 60, coins being currently fed out from the feeding unit 60, and coins that have been fed out from the feeding unit 60 and are currently transported toward the recognition unit 40 are stored in the second storage unit 52 if these coins are recognized as 10-JPY coins by the recognition unit 40.

For example, even when the coin for replenishment is 50-JPY coin and the shortage denomination is 10-JPY coin, i.e., the denomination of a coin for replenishment is different from the shortage denomination, it is possible to store the 10-JPY coins of the shortage denomination into the second storage unit 52 during the replenishment process by performing the replenishment process in the first replenishment extension mode. Although the number of 10-JPY coins included in the minimum number of constituent coins of a change to be stored in the second storage unit 52 is four, if 10-JPY becomes a shortage denomination, the coin handling apparatus 1 allows five or more 10-JPY coins to be stored in the second storage unit 52.

As described above, in the replenishment process in the first replenishment extension mode, regardless of whether or not the shortage denomination is included in the denominations of coins for replenishment, the coin handling apparatus 1 can store coins of the shortage denomination into the second storage unit 52. In addition, as to coins of the shortage denomination, the coin handling apparatus 1 allows storage of these coins larger in number than the minimum number of constituent coins set to be stored in the second storage unit 52. The second storage unit 52 can store the coins of the shortage denomination during the replenishment process. Consequently, when the replenishment process for the coins of the shortage denomination becomes required, it is possible to avoid the replenishment process from being continued for a long time.

Figure 7A:
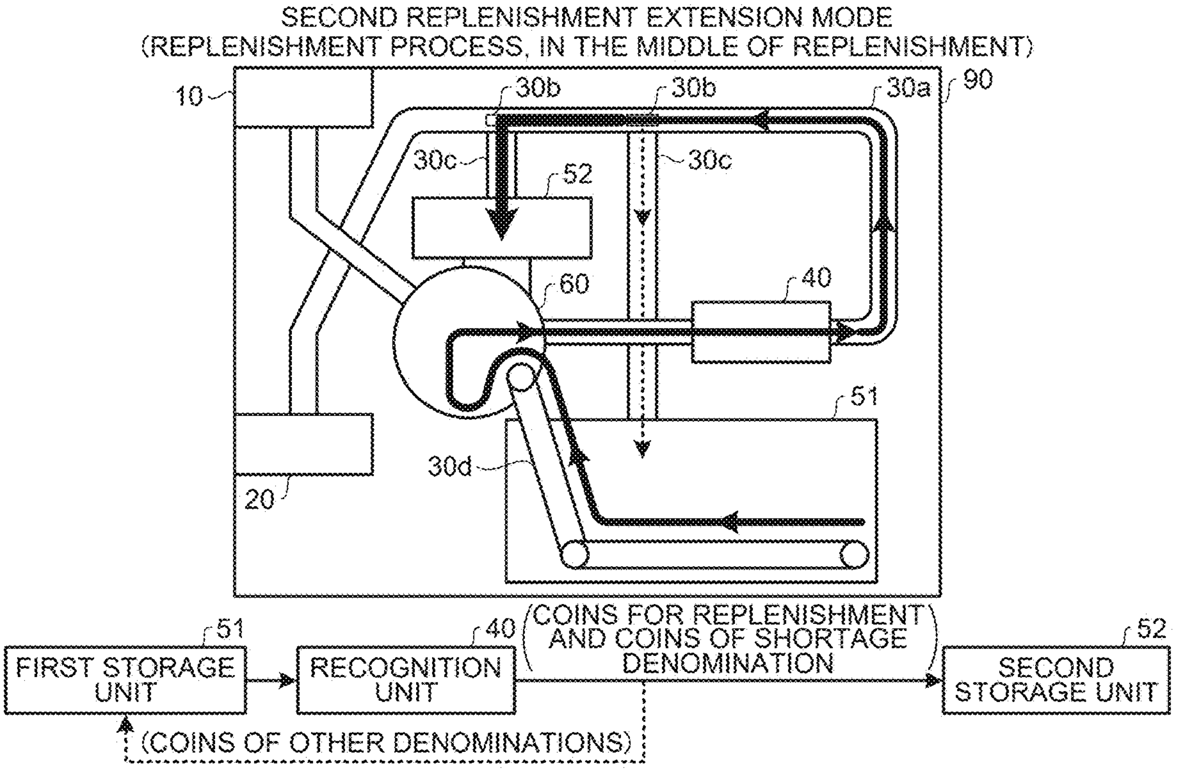
FIGS. 7A and 7B illustrate an operation of the coin handling apparatus in a second replenishment extension mode.
Figure 7B:
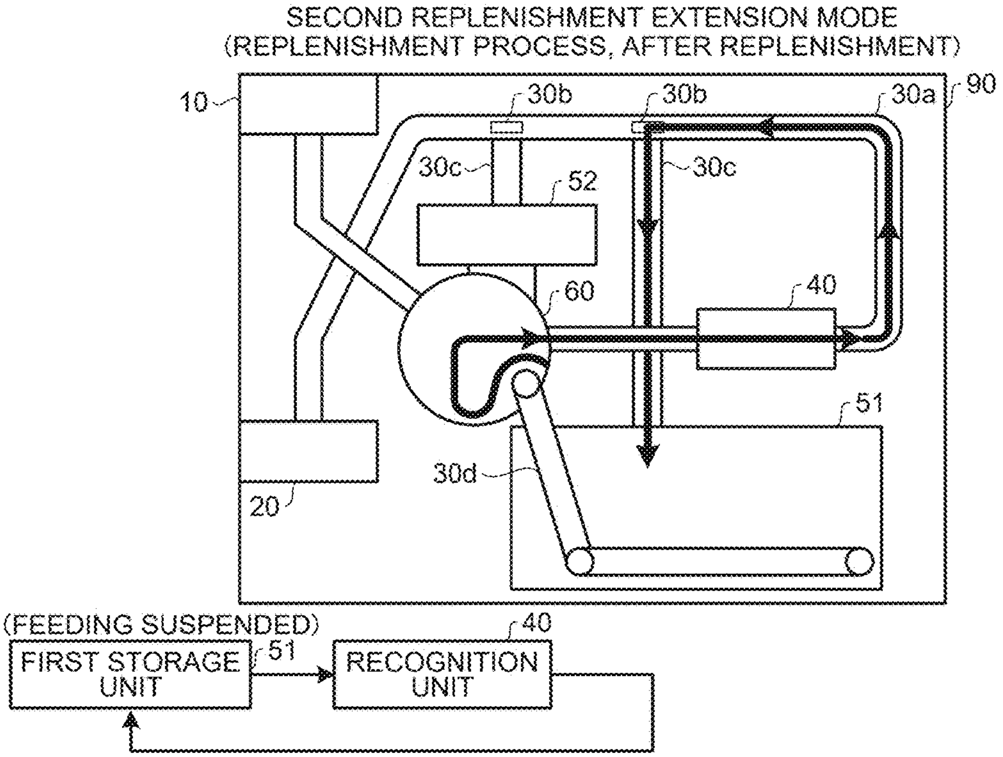

FIGS. 7A and 7B illustrate the operation of the coin handling apparatus 1 in the second replenishment extension mode. When a shortage denomination has been found, the coin handling apparatus 1 can perform the replenishment process in the second replenishment extension mode. The replenishment process in the second replenishment extension mode is different from the replenishment process in the first replenishment extension mode in that coins of the shortage denomination are stored in the second storage unit 52 from the time point when the replenishment process is started.

After starting the replenishment process in the second replenishment extension mode, the coin handling apparatus 1 recognizes the denominations of coins fed out from the first storage unit 51 by using the recognition unit 40, and stores coins for replenishment and coins of the shortage denomination into the second storage unit 52 as shown in FIG. 7A. Coins that are neither coins for replenishment nor coins of the shortage denomination are returned to the first storage unit 51.

The process after replenishing the second storage unit 52 with the coins for replenishment is performed in the same way as that of the replenishment process in the normal mode shown in FIG. 4B. Specifically, as shown in FIG. 7B, all the coins remaining in the transport path and the feeding unit 60 are returned to the first storage unit 51.

In the replenishment process of the second replenishment extension mode, as in the replenishment process of the first replenishment extension mode, the coin handling apparatus 1 stores the coins of the shortage denomination into the second storage unit 52 regardless of whether or not the shortage denomination is included in the denominations of coins for replenishment. The coin handling apparatus 1 allows the coins of the shortage denomination larger in number than the minimum number of constituent coins, to be stored in the second storage unit 52. The second storage unit 52 can store a larger number of coins of the shortage denomination than usual, during the replenishment process. Therefore, when the replenishment process for the coins of the shortage denomination becomes required, it is possible to avoid the replenishment process from being continued for a long time.

In the first replenishment extension mode shown in FIGS. 6A and 6B, the coins of the shortage denomination are stored in the second storage unit 52 after replenishment of the second storage unit 52 with coins for replenishment has been completed. Meanwhile, in the second replenishment extension mode shown in FIGS. 7A and 7B, the coins of the shortage denomination are stored in the second storage unit 52 while the second storage unit 52 is being replenished with coins for replenishment. In addition, the coin handling apparatus 1 may combine the first extension mode with the second replenishment extension mode to store the coins of the shortage denomination into the second storage unit 52 during the period from when the replenishment process is started to when the replenishment process is ended. Combination of a plurality of extension modes will be described later.

The coin handling apparatus 1 that performs money handling in the extension mode can store coins larger in number than the minimum number of constituent coins into the second storage unit 52. For example, it is assumed that 100-JPY coin, for which the minimum number of constituent coins is four, becomes a shortage denomination, and the coin handling apparatus 1 stores six 100-JPY coins in the second storage unit 52 in the extension mode. In this case, even if three 100-JPY coins are dispensed from the second storage unit 52 in the change dispensing process to be performed later, three 100-JPY coins still remain in the second storage unit 52. Therefore, in the replenishment process to be performed after the change dispensing process, the number of 100-JPY coins reaches four, which is the minimum number of constituent coins, by replenishing the second storage unit 52 with only one 100-JPY coin. Thus, the time required for the replenishment process can be reduced.

As described above, the coin handling apparatus 1 operating in the normal mode uses the first storage unit 51 for storage of deposited coins and feeding-out of coins for replenishing the second storage unit 52, and uses the second storage unit 52 for storage of coins to be dispensed. When a shortage denomination has been found, the coin handling apparatus 1 can be operated in the dispensing extension mode. The coin handling apparatus 1 operating in the dispensing extension mode changes the manner of using the first storage unit 51 and the second storage unit 52 from that in the normal mode. In the dispensing extension mode, storage of deposited coins and feeding-out of coins to be dispensed are performed in both the first storage unit 51 and the second storage unit 52.

Figure 8A:
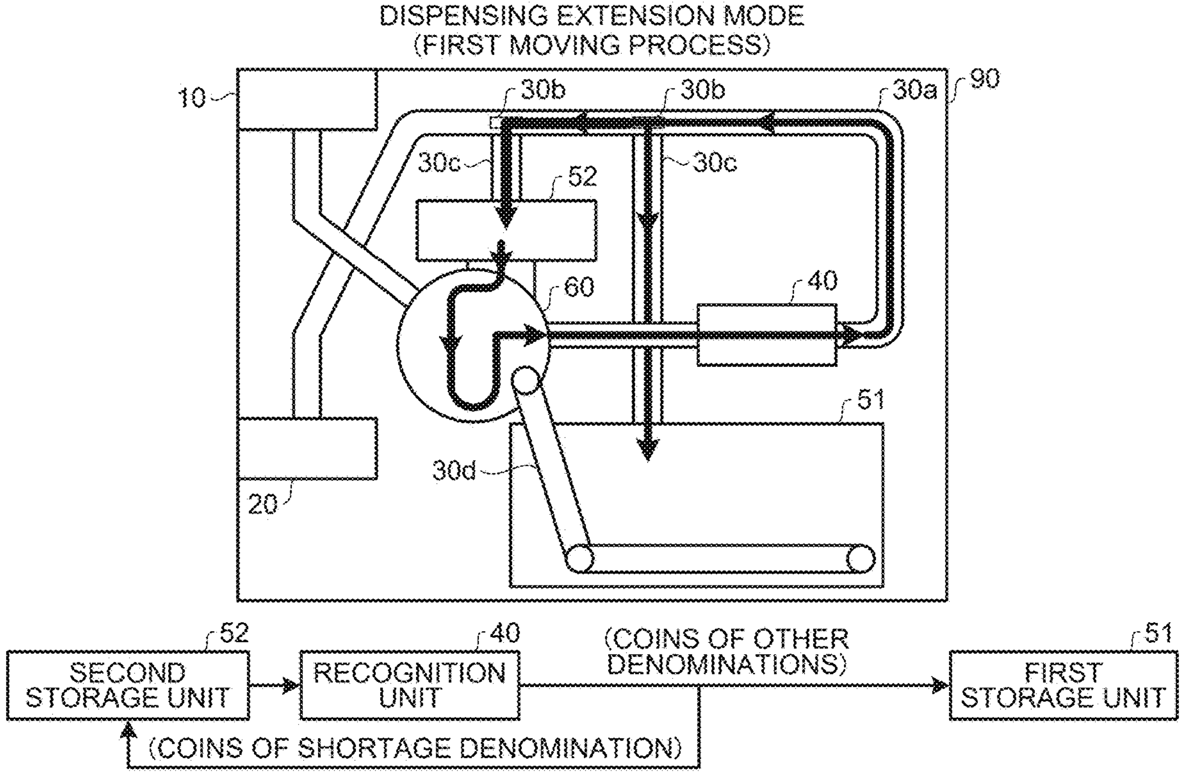
FIGS. 8A and 8B illustrate a money moving process performed in a dispensing extension mode.
Figure 8B:
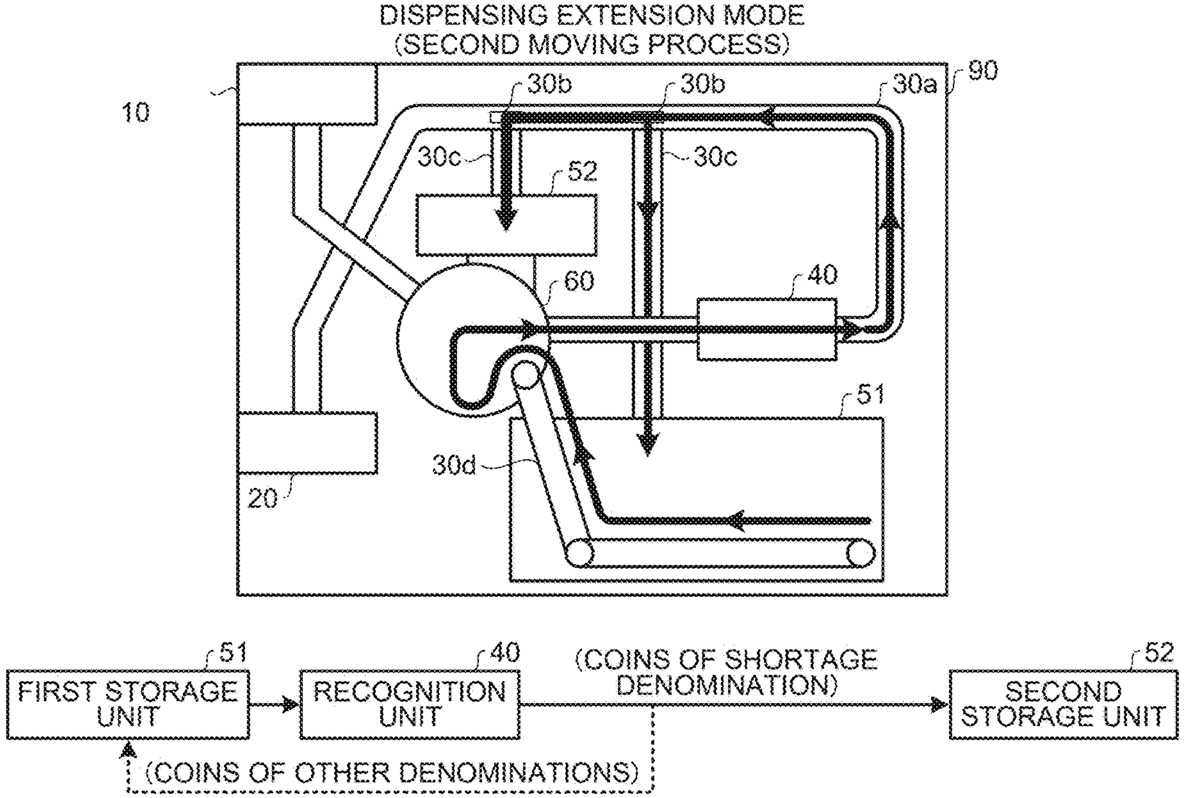

When the operation mode is switched to the dispensing extension mode, the coin handling apparatus 1 can perform a process of moving coins between the first storage unit 51 and the second storage unit 52. FIGS. 8A and 8B illustrate the moving process performed in the dispensing extension mode. FIG. 8A illustrates a first moving process, and FIG. 8B illustrates a second moving process. In the dispensing extension mode, storage and feeding-out of coins of the shortage denomination are performed with the second storage unit 52, and storage and feeding-out of coins of denominations other than the shortage denomination are performed with the first storage unit 51. The coin handling apparatus 1 that has determined to shift to the dispensing extension mode performs the first moving process to establish a state where the second storage unit 52 stores only the coins of the shortage denomination.

As shown in FIG. 8A, the coin handling apparatus 1 that has started the first moving process discharges all the coins of a plurality of denominations stored in the second storage unit 52 in a mixed state, to the feeding unit 60. The coin handling apparatus 1 feeds out coins one by one from the feeding unit 60, recognizes the coins with the recognition unit 40, returns coins of the shortage denomination to the second storage unit 52 and stored therein, while storing coins of the other denominations into the first storage unit 51. In the first moving process, the coins of the denominations other than the shortage denomination stored in the second storage unit 52 are moved to the first storage unit 51. Consequently, after the first moving process, the second storage unit 52 stores only the coins of the shortage denomination.

If coins of the shortage denomination are not included in the coins being stored in the first storage unit 51 at the stage where the first moving process has been ended, the coin handling apparatus 1 starts the operation in the dispensing extension mode. It can be confirmed based on the inventory amount information in the memory 110 whether or not coins of the shortage denomination are stored in the first storage unit 51.

If coins of the shortage denomination are included in the coins being stored in the first storage unit 51, the coin handling apparatus 1 may further perform the second moving process. In the second moving process, as shown in FIG. 8B, the coin handling apparatus 1 feeds out coins from the first storage unit 51, transports the coins to the feeding unit 60, recognizes the coins fed out from the feeding unit 60 by using the recognition unit 40, stores coins of the shortage denomination into the second storage unit 52, while storing coins of denominations other than the shortage denomination into the first storage unit 51. In the second moving process, the coins of the shortage denomination stored in the first storage unit 51 are moved to the second storage unit 52.

The second moving process is performed to establish a state where the second storage unit 52 stores only coins of the shortage denomination while the first storage unit 51 stores coins of a plurality of denominations other than the shortage denomination in a mixed state. The second moving process may be performed subsequently to execution of the first moving process after shifting to the dispensing extension mode. The second moving process may be performed after a while from execution of the first moving process, by using a spare time when other coin handling is not performed in the coin handling apparatus 1.

When the coins of the shortage denomination stored in the first storage unit 51 satisfy a predetermined condition, the coin handling apparatus 1 may not necessarily perform the second moving process. For example, when the number of coins of the shortage denomination stored in the first storage unit 51 is less than a predetermined threshold value, the coin handling apparatus 1 may be set not to perform the second moving process. For another example, when the ratio of the number of coins of the shortage denomination to the number of all the coins in the first storage unit 51 is smaller than a predetermined threshold value, the coin handling apparatus 1 may be set not to perform the second moving process. Since coins of the shortage denomination can be moved from the first storage unit 51 to the second storage unit 52 during the dispensing process in the dispensing extension mode described later, the second moving process may be set not to be performed, regardless of the number of coins of the shortage denomination stored in the first storage unit.

The first moving process may not necessarily be performed independently from other money handlings. The first moving process may be performed in combination with the change dispensing process when the change dispensing process is performed for the first time after the operation mode has been switched to the dispensing extension mode. Specifically, during the change dispensing process, among the coins discharged from the second storage unit 52 to the feeding unit 60, the coin handling apparatus 1 may dispense coins constituting the change from the dispensing unit 20, return coins of the shortage denomination to the second storage unit 52, and store the remaining coins into the first storage unit 51.

After switching the operation mode to the dispensing extension mode, the coin handling apparatus 1 performs at least the first moving process independently from other money handlings or in combination with the dispensing process, thereby establishing a state where the second storage unit 52 stores only coins of the shortage denomination. The coin handling apparatus 1 performs the depositing process and the dispensing process in the dispensing extension mode, by using the second storage unit 52 in which only the coins of the shortage denomination are stored, and the first storage unit 51 in which coins of a plurality of denominations are stored in a mixed state.

Figure 9A:
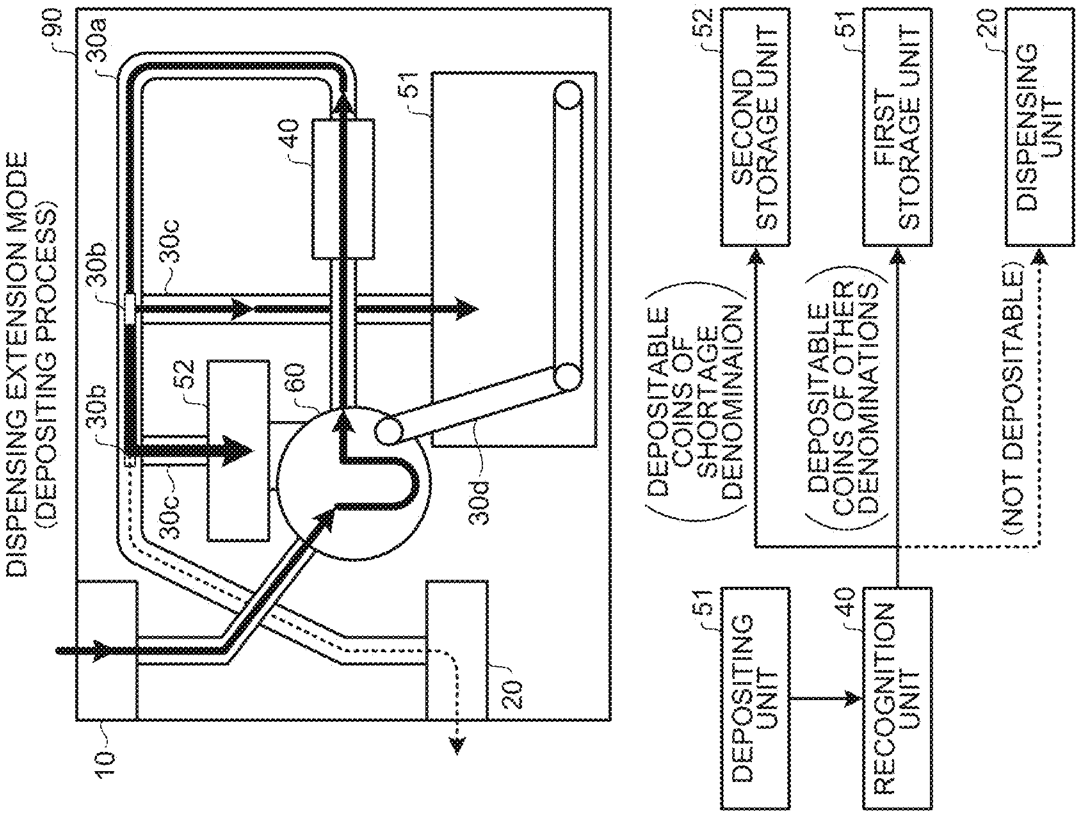
FIGS. 9A and 9B illustrate an operation of the coin handling apparatus in the dispensing extension mode.
Figure 9B:
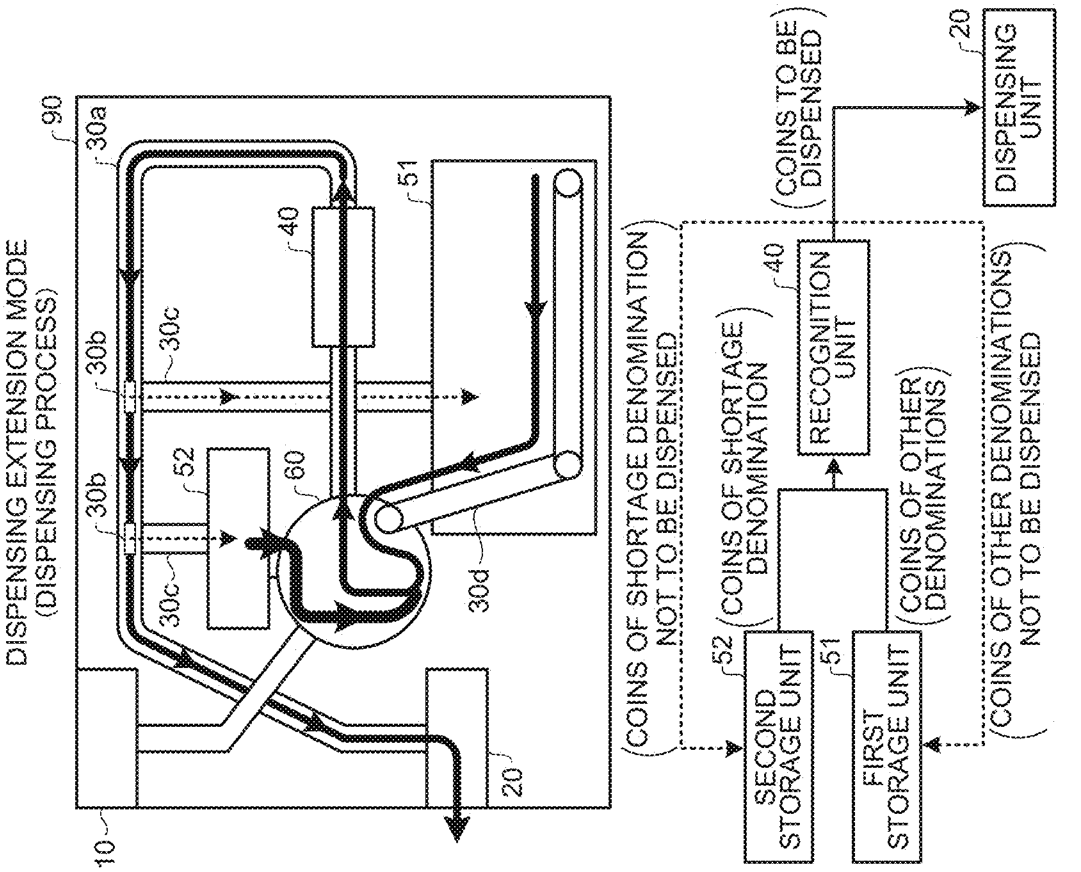

FIGS. 9A and 9B illustrate the operation of the coin handling apparatus 1 in the dispensing extension mode. The coin handling apparatus 1 that has been shifted to the dispensing extension mode performs a depositing process and a dispensing process different in contents from those in the normal mode. FIG. 9A illustrates the depositing process performed in the dispending extension mode, and FIG. 9B illustrates the dispensing process performed in the dispensing extension mode.

In the depositing process, as shown in FIG. 9A, the coin handling apparatus 1 receives coins from the depositing unit 10 into the feeding unit 60, feeds out the coins one by one to the upper transport unit 30*a*, and recognizes the coins by using the recognition unit 40. The coin handling apparatus 1 rejects coins that cannot be deposited, from the dispensing unit 20, as in the depositing process in the normal mode. Meanwhile, coins that can be deposited are handled by a method different from that in the normal mode. Among the coins that can be deposited, the coin handling apparatus 1 stores coins of the shortage denomination into the second storage unit 52, and stores coins of denominations other than the shortage denomination into the first storage unit 51. The depositing process in the dispensing extension mode is similar to the depositing process in the depositing extension mode.

In the dispensing process, among coins to be dispensed, the coin handling apparatus 1 dispenses coins of the shortage denomination from the second storage unit 52, and dispenses coins of denominations other than the shortage denomination from the first storage unit 51. Specifically, as shown in FIG. 9B, the coin handling apparatus 1 discharges, to the feeding unit 60, all the coins of the shortage denomination stored in the second storage unit 52, and starts a process of transporting the coins stored in the first storage unit 51 to the feeding unit 60 by using the lower transport unit 30*d*. The coin handling apparatus 1 transports the coins in the feeding unit 60 one by one by using the upper transport unit 30*a*, recognizes the coins by using the recognition unit 40, and discharges coins to be dispensed, from the dispensing unit 20 to the outside of the apparatus. Meanwhile, coins not to be dispensed are returned to the first storage unit 51 and the second storage unit 52. Among the coins not to be dispensed, the coin handling apparatus 1 stores coins of the shortage denomination into the second storage unit 52, and stores coins of denominations other than the shortage denomination into the first storage unit 51.

As long as coins of the shortage denomination are included in the coins stored in the first storage unit 51, a coin of the shortage denomination may be fed out from the first storage unit 51 during the dispensing process. When the coin of the shortage denomination is a coin to be dispensed in the dispensing process, this coin of the shortage denomination is dispensed from the dispensing unit 20, regardless of whether this coin has been stored in the first storage unit 51 or the second storage unit 52. After completing dispensing of the coin of the shortage denomination among the coins to be dispensed, if a coin of the shortage denomination is included in the coins recognized by the recognition unit 40, this coin is stored in the second storage unit 52. Thus, while repeating the dispensing process, coins of the shortage denomination among the coins currently stored in the first storage unit 51 are moved to the second storage unit 52.

A specific example will be described. For example, it is assumed that 100-JPY coin becomes a shortage denomination while the minimum number of constituent coins including four 100-JPY coins are being stored in the second storage unit 52, and the coin handling apparatus 1 is shifted to the dispensing extension mode. In this case, the coin handling apparatus 1 performs the first moving process, and moves all the coins of denominations other than the shortage denomination to the first storage unit 51 while leaving only the four 100-JPY coins in the second storage unit 52. If coin handling need not be performed immediately after completion of the first moving process, the coin handling apparatus 1 may perform the second moving process to move 100-JPY coins among the coins currently stored in the first storage unit 51, to the second storage unit 52. The second moving process may be performed for a predetermined time, or may be continuously performed until a depositing process for transaction with the customer becomes necessary.

Thereafter, in the depositing process performed in the dispensing extension mode, 100-JPY coins are stored in the second storage unit 52. Therefore, the number of 100-JPY coins being the shortage denomination is not increased in the first storage unit 51. If coins to be dispensed in the dispensing process are only 100-JPY coins, the coin handling apparatus 1 discharges 100-JPY coins from the second storage unit 52 to the feeding unit 60, and performs the dispensing process. If 100-JPY coins are not included in the coins to be dispensed, the coin handling apparatus 1 transports the coins from the first storage unit 51 to the feeding unit 60, and performs the dispensing process. At this time, if a 100-JPY coin is included in the coins fed out from the first storage unit 51, this 100-JPY coin is stored in the second storage unit 52. If 100-JPY coins and coins of the other denominations are included in the coins to be dispensed, the dispensing process is performed by using the 100-JPY coins in the second storage unit 52 and the coins in the first storage unit 51 as described above. The coin handling apparatus 1 stores all the 100-JPY coins, which have been obtained from the feeding unit 60 after completing the dispensing of 100-yen coins, into the second storage unit 52. After dispensing all the coins to be dispensed, the coin handling apparatus 1 stores 100-JPY coins into the second storage unit 52 and stores coins other than the 100-JPY coins into the first storage unit 51, among the remaining coins being currently transported by the transport unit 30 and the coins currently stored in the feeding unit 60, thereby completing the dispensing process.

After shifting to the dispensing extension mode, only the coins of the shortage denomination are stored in the second storage unit 52. Therefore, in contrast to the normal mode, it is not necessary to perform the replenishment process of replenishing the second storage unit 52 with the coins fed out from the first storage unit 51. However, if a coin of the shortage denomination is included in the coins currently stored in the first storage unit 51, the coin handling apparatus 1 may perform the second moving process in order to move this coin of the shortage denomination from the first storage unit 51 to the second storage unit 52.

Figure 10:
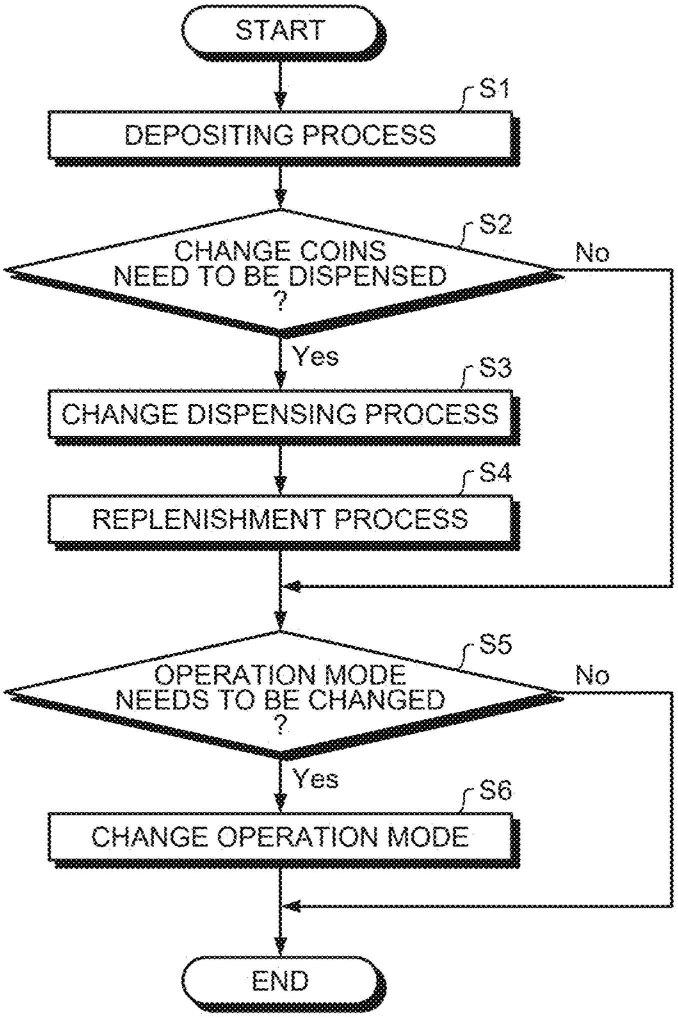
FIG. 10 is a flowchart showing an example of processes that the coin handling apparatus performs.

FIG. 10 is a flowchart showing an example of processes that the coin handling apparatus 1 performs. The processes shown in FIG. 10 are realized by the control unit 100 controlling the functions and operations of the components of the coin handling unit 90. When a transaction amount between the store and the customer has been determined, the coin handling apparatus 1 performs the depositing process in the normal mode as shown in FIG. 10 so that the store receives the transaction amount by cash from the customer (step S1).

If change coins need to be returned to the customer (step S2; Yes), the coin handling apparatus 1 performs the change dispensing process in the normal mode (step S3). After the dispensing process, in order to replenish the second storage unit 52 with coins, the coin handling apparatus 1 performs the replenishment process in the normal mode (step S4). If change coins need not be dispensed (step S2; No), neither the dispensing process nor the replenishment process is performed.

When the depositing process has been performed, or the depositing process, the dispensing process, and the replenishment process have been performed, and thereby the inventory amount in the first storage unit 51 is changed, the coin handling apparatus 1 determines whether or not the operation mode needs to be changed from the normal mode to the extension mode (step S5). If the operation mode needs to be changed (step S5; Yes), the coin handling apparatus 1 changes the operation mode from the normal mode to the extension mode (step S6). As a result, from the next depositing process, at least one of the depositing process, the replenishment process, and the dispensing process will be performed in the aforementioned extension mode. If the operation mode need not be changed (step S5; No), the coin handling apparatus 1 ends the handling without changing the operation mode.

Figure 11:
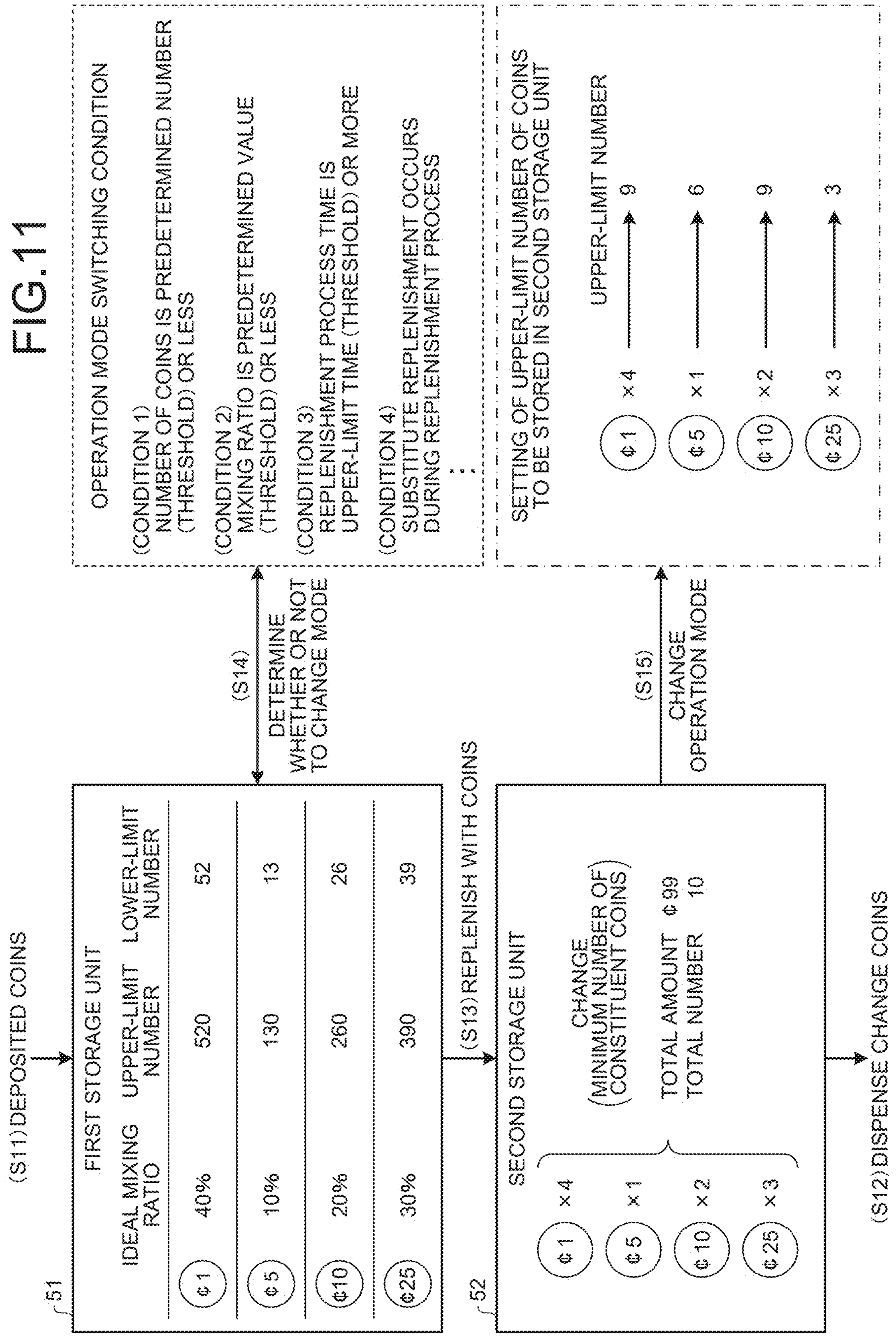
FIG. 11 illustrates an example of a method for changing of an operation mode.

FIG. 11 illustrates change of the operation mode. FIG. 11 shows an exemplary case where the coin handling apparatus 1 handles 1-USC (United States cents) coins, 5-USC coins, 10-USC coins, and 25-USC coins which are United States coins.

The second storage unit 52 is configured to store a minimum number of constituent coins constituting a change in United States coins. Specifically, as shown in FIG. 11, four 1-USC coins, one 5-USC coin, two 10-USC coins, and three 25-USC coins, i.e., ten coins equivalent to 99 USCs in total, are stored in the second storage unit 52.

When operating in the normal mode, the coin handling apparatus 1 stores all the deposited coins into the first storage unit 51 (S11), dispenses all the coins to be dispensed, from the second storage unit 52 (S12), and replenishes the second storage unit 52 with coins equivalent to the denominations and the number for each denomination of the coins fed out from the first storage unit 51 (S13). Thus, before the next depositing process is started, the second storage unit 52 is returned to the state where the minimum number of constituent coins are stored therein again.

When replenishing the second storage unit 52 with coins, in order to avoid a situation that coins for replenishment are not fed out from the first storage unit 51 for a long time, the percentage of the number of coins of each denomination currently stored in the first storage unit 51 is preferably equal to the percentage of the number of coins of each denomination corresponding to the minimum number of the constituent coins to be stored in the second storage unit 52. Coins to be stored in the second storage unit 52 are four 1-USC coins, one 5-USC coin, two 10-USC coins, and three 25-USC coins, and the percentages in number of 1-USC coins, 5-USC coins, 10-USC coins, and 25-USC coins are 40%, 10%, 20%, and 30%, respectively. Therefore, as shown in FIG. 11, the ideal mixing ratios of 1-USC coins, 5-USC coins, 10-USC coins, and 25-USC coins currently stored in the first storage unit 51 are 40%, 10%, 20%, and 30%, respectively. Note that the mixing ratio is a ratio of the number of coins of each denomination currently stored in the first storage unit 51 to the number of all the coins currently stored in the first storage unit 51.

An upper-limit number of coins for each denomination to be stored is set for the first storage unit 51. The upper-limit number may be set based on the ideal mixing ratio. For example, when the upper limit of the number of coins storable in the first storage unit 51 (maximum storage number) is 1300, the upper-limit number of 1-USC coins calculated based on the ideal mixing ratio is 520 (=1300×40%), as shown in FIG. 11. Likewise, the upper-limit numbers of coins of the other denominations are 130 for 5-USC coins, 260 for 10-USC coins, and 390 for 25-USC coins, based on the maximum storage number of coins in the first storage unit 51 and the ideal mixing ratios. The upper-limit number may be automatically set by the coin handling apparatus 1, or may be set by the user of the coin handling apparatus 1, such as a clerk of a store where the coin handling apparatus 1 is installed.

A lower-limit number of coins for each denomination to be stored is set for the first storage unit 51. The lower-limit number may be set based on the upper-limit number. For example, a number obtained by multiplying the upper-limit number for each denomination by a predetermined coefficient is set as the lower-limit number. FIG. 11 shows an example in which a number obtained by multiplying the upper-limit number by a coefficient of 0.1 is set as the lower-limit number. The lower-limit number may be automatically set by the coin handling apparatus 1, or may be set by the user of the coin handling apparatus 1.

The coin handling apparatus 1 detects a shortage denomination by monitoring the number of coins for each denomination currently stored in the first storage unit 51. The coin handling apparatus 1 determines that it is necessary to replenish the first storage unit 51 with coins of the detected shortage denomination from the outside of the apparatus.

The coin handling apparatus 1 can perform a notification process of notifying the clerk of the determination result. In the notification process, for example, information requesting replenishment of coins of the shortage denomination is displayed, for the clerk, on an external device such as the cash register or the display device connected to the coin handling apparatus 1.

In the memory 110 of the coin handling apparatus 1, switching conditions for switching the operation mode from the normal mode to the extension mode, based on the inventory amount information of the first storage unit 51, are stored in advance. The coin handling apparatus 1 determines whether or not switching of the operation mode is necessary, based on the switching conditions stored in the memory 110 (S14). The user of the coin handling apparatus 1, such as the clerk of the store where the coin handling apparatus 1 is installed, can set the condition for switching the operation mode, i.e., the condition for determining whether or not to change the operation mode.

For example, the clerk sets the lower-limit number of coins for each denomination to be stored in the first storage unit 51, as a threshold value. Specifically, as indicated by "condition 1" in a broken-line frame shown in FIG. 11, when the number of coins decreases and the number of coins of a certain denomination has reached a predetermined threshold value, the coin handling apparatus 1 determines this denomination to be a shortage denomination, and switches the operation mode from the normal mode to the extension mode. The threshold value may not necessarily be the lower-limit number. For example, the threshold value may be another number obtained by multiplying the upper-limit number or the lower-limit number by a predetermined coefficient.

For example, as indicated by "condition 2" shown in FIG. 11, a switching condition is set such that, when the mixing ratio of a certain denomination in the first storage unit 51 decreases and has reached a predetermined threshold value, this denomination is determined as a shortage denomination and the operation mode is switched from the normal mode to the extension mode. The threshold value may be the ideal mixing ratio, or another mixing ratio obtained by multiplying the ideal mixing ratio by a predetermined coefficient.

For example, as indicated by "condition 3" shown in FIG. 11, a switching condition is set such that, when the time required for the replenishment process exceeds a predetermined threshold value because there is a coin of a denomination, which has taken a long time for feeding-out from the first storage unit 51 during the change replenishment process, this denomination is determined as a shortage denomination and the operation mode is switched.

If substitute replenishment is allowed to be performed when the second storage unit 52 is replenished with coins in the coin handling apparatus 1, a switching condition may be set such that a denomination for which substitute replenishment has been performed is determined as a shortage denomination and the operation mode is switched from the normal mode to the extension mode, as indicated by "condition 4" shown in FIG. 11. The substitute replenishment is a setting such that, when performing the replenishment process of replenishing the second storage unit 52 with coins from the first storage unit 51, replenishment with coins of another denomination instead of coins of a denomination for replenishment is allowed.

FIG. 12 illustrates the substitute replenishment. In FIG. 12, as indicated by "minimum number of constituents" corresponding to each denomination for replenishment, the minimum number of constituent coins (United States coins) consists of four 1-USC coins, one 5-USC coin, two 10-USC coins, and three 25-USC coins.

Since there is no denomination lower than 1-USC coins, substitute replenishment cannot be performed for 1-USC coins. Meanwhile, as for 5-USC coins, substitute replenishment can be performed by using 1-USC coins of the lower denomination. Therefore, as indicated by "substitute replenishment 1" in FIG. 12, substitute replenishment using five 1-USC coins instead of one 5-USC coin (minimum number of constituent coins) is allowed. In other words, in the replenishment process, one 5-USC coin (minimum number of constituent coins) may be stored in the second storage unit 52, or five 1-USC coins may be stored instead of one 5-USC coin in the second storage unit 52. When the substitute replenishment has been performed, five 1-USC coins are dispensed instead of one 5-USC coin in the change dispensing process for dispensing one 5-USC coin.

Likewise, as for 10-USC coins, "substitute replenishment 1" using one 10-USC coin and two 5-USC coins and "substitute replenishment 2" using four 5-USC coins, instead of two 10-USC coins (minimum number of constituent coins), are allowed. As for 25-USC coins, "substitute replenishment 1" using one 5-USC coins, two 10-USC coins, and two 25-USC coins, "substitute replenishment 2" using five 10-USC coins and one 25-USC coin, and "substitute replenishment 3" using one 5-USC coin and seven 10-USC coins, instead of three 25-USC coins (minimum number of constituent coins), are allowed.

For example, in a case where the coin handling apparatus 1 operating in the normal mode dispenses a change from the second storage unit 52 and replenishes the second storage unit 52 with coins from the first storage unit 51 in the subsequent replenishment process, if coins for replenishment cannot be obtained even after a predetermined time (threshold value) set in advance has elapsed, the substitute replenishment shown in FIG. 12 is performed.

Specifically, for example, after starting the replenishment process for replenishing the second storage unit 52 with one 5-USC coin from the first storage unit 51, in a case where one 5-USC coin cannot be fed out from the first storage unit 51 even after the predetermined threshold time has elapsed from the start of the replenishment process, coins for replenishment are changed from one 5-USC coin to five 1-USC coins, based on substitute replenishment setting shown in FIG. 12. In FIG. 11, "condition 4" in the broken-line frame indicates an example in which a denomination for which substitute replenishment based on the substitute replenishment setting is performed during the replenishment process is determined as a shortage denomination, and the operation mode is switched to the extension mode from the normal mode.

Regarding the operation mode switching condition, only one condition may be set, or a plurality conditions may be set. In the latter case, when any one condition has been satisfied, the coin handling apparatus 1 may determine that a shortage denomination is detected, and switch the operation mode from the normal mode to the extension mode.

When the operation mode of the coin handling apparatus 1 is switched from the normal mode to the extension mode, it is allowed to store coins larger in number than the minimum number of constituent coins for change, into the second storage unit 52, as described above. As shown in FIG. 11, the coin handling apparatus 1 may change the upper-limit number of coins for each denomination to be stored in the second storage unit 52 (S15).

For example, as shown in FIG. 12, the upper-limit number of coins for each denomination is set based on the substitute replenishment setting (S16). The upper-limit number is calculated based on the numbers of coins for replenishment by denominations, which are enclosed in circles in FIG. 12. Specifically, as for 1-USC coins, the upper-limit number of coins is set to nine coins in total consisting of four coins that is the minimum number of constituent coins of 1-USC coins and five coins for substitute replenishment for 5-USC coins.

Likewise, the upper-limit number of 5-USC coins is six coins in total obtained by summing up the numbers enclosed in circles among the numbers of 5-USC coins for replenishment by denominations, which are vertically arranged in FIG. 12. Specifically, the upper limit number of 5-USC coins is set to six coins in total consisting of one coin as the minimum number of constituent coins of 5-USC coins, four coins that is the maximum number of 5-USC coins among the numbers set for substitute replenishment of 10-USC coins, and one coin that is the maximum number of 5-USC coins among the numbers set for substitute replenishment of 25-USC coins. The upper-limit number of 10-USC coins is nine coins in total consisting of two coins as the minimum number of constituent coins of 10-USC coins, and seven coins that is the maximum number of 10-USC coins among the numbers set for substitute replenishment of 25-USC coins. As for 25-USC coins, three coins as the minimum number of constituent coins of 25-USC coins is the upper-limit number of coins.

When switching the operation mode to the extension mode, as shown in a dashed-and-dotted line frame in FIG. 11, the coin handling apparatus 1 may set the upper-limit number calculated based on the substitute replenishment setting, as the upper-limit number of coins for each denomination to be stored in the second storage unit 52.

For example, as for 1-USC coins, during the operation in the normal mode, four 1-USC coins that is the minimum number of constituent coins are stored in the second storage unit 52. In other words, in the normal mode, when the replenishment process is completed, the number of 1-USC coins being stored in the second storage unit 52 does not become three or less, nor 5 or more.

Meanwhile, after 1-USC coin become a shortage denomination and the operation mode is switched from the normal mode to the extension mode, the coin handling apparatus 1 can store, in the second storage unit 52, up to nine 1-USC coins set as the upper-limit number, with the lower-limit number being four that is the minimum number of constituent coins having been set for 1-USC coins. Specifically in the aforementioned process in the extension mode, four or more and nine or less 1-USC coins can be stored in the second storage unit 52. Likewise, in the extension mode, one or more and six or less 5-USC coins can be stored in the second storage unit 52, and two or more and nine or less 10-USC coins can be stored in the second storage unit 52. As for 25-USC coins, three 25-USC coins can be stored in the second storage unit 52 regardless of the operation mode. However, this is an example, and a number obtained by multiplying the minimum number of constituent coins of each denomination by a predetermined coefficient, such as twice the minimum number of constituent coins, may be set as an upper-limit number. Alternatively, upper-limit numbers may be set by different methods for the respective denominations. For example, in the example described with reference to FIGS. 11 and 12, since the upper-limit number of 25-USC coins, which is the maximum denomination, becomes the same as the minimum number of constituent coins between the normal mode and the extension mode, the upper-limit number of 25-USC coins being the maximum denomination may be set to six (twice the minimum number of constituent coins) or nine (triple the minimum number of constituent coins) while the upper-limit number for each of the other denominations is set according to the substitute replenishment setting as described above.

As described above, when the coin handling apparatus 1, which has switched the operation mode to the extension mode due to occurrence of a shortage denomination, stores coins larger in number than the minimum number of constituent coins for change into the second storage unit 52, the coin handling apparatus 1 may set the upper-limit number, thereby preventing dispensing of coins of the other denominations from becoming difficult during the change dispensing process.

For example, when one 5-USC coin is to be dispensed from the second storage unit 52 in which the minimum number of constituent coins of United States coins are stored, this one 5-USC coin is dispensed from among ten coins in total discharged from the second storage unit 52 to the feeding unit 60. Meanwhile, for example, it is assumed that 1-USC coin becomes a shortage denomination and thirty coins, i.e., twenty 1-USC coins added to ten coins as the minimum number of constituent coins, are stored in the second storage unit 52. In this case, when one 5-USC coin is to be dispensed, this 5-USC coin has to be dispensed from among the thirty coins in total discharged from the second storage unit 52 to the feeding unit 60, which may take a long time to complete the dispensing. Even in the operation in the extension mode, the time required for the dispensing process can be reduced by limiting the number of 1-USC coins that can be stored in the second storage unit 52 to nine as described above.

It can be set that the upper-limit number of coins of the shortage denomination in the extension mode is determined based on the maximum number of coins storable in the second storage unit 52, and the ideal mixing ratios. For example, when the maximum number of coins storable in the second storage unit 52 is 50 and 1-USC coin becomes a shortage denomination, since the ideal mixing ratio of 1-USC coins is 40%, the upper-limit number of 1-USC coins is set to 20 (=50×40%). Likewise, the upper-limit numbers of coins of the other denominations are also set to five 5-USC coins (=50×10%), ten 10-USC coins (=50×20%), and fifteen 25-USC coins (=50×30%), based on the maximum storage number of coins in the second storage unit 52, and the ideal mixing ratios.

The operation mode switching conditions shown in the broken-line frame in FIG. 11 are examples, and conditions other than these may be set as the operation mode switching conditions. The operation mode switching conditions may not necessarily be common to all the denominations, and different switching conditions may be set for the respective denominations. For example, different threshold values of switching conditions may be set for the respective denominations.

Specifically, different threshold values may be set between a denomination substitutable by a lower denomination, and the lowest denomination that is not substitutable. For example, in the example of "condition 1" shown in FIG. 11, the threshold values for 5-USC coins, 10-USC coins, and 25-USC coins which are substitutable by lower denominations may be set to 13, 26, and 39, respectively, which are the lower-limit numbers for the first storage unit 51. On the other hand, the threshold value for 1-USC coins not substitutable by a lower denomination may be set to a number larger than 52 that is the lower-limit number.

For example, in the example of "condition 2" shown in FIG. 11, the threshold values for 5-USC coins, 10-USC coins, and 25-USC coins may be set to the mixing ratios of 5%, 15%, and 25%, respectively, each being 5% lower than the ideal mixing ratio, and the threshold value for 1-USC coins may be set to, for example, 37% being 3% lower than the ideal mixing ratio, or a value higher than the ideal mixing ratio.

For example, in the example of "condition 3" shown in FIG. 11, the threshold values of the replenishment process for 5-USC coins, 10-USC coins, and 25-USC coins may be set to the same time period, and the threshold value of the replenishment process for 1-USC coins may be set to a time period longer than the time periods for the other denominations.

In another example, for a certain denomination, a threshold value may not necessarily be set and the operation mode may not necessarily be switched to the extension mode. For example, a threshold value may be set and the operation mode may be switched for the lowest denomination not substitutable by a lower denomination, whereas the operation mode may not necessarily be switched for another denomination substitutable by a lower denomination.

Figure 13:
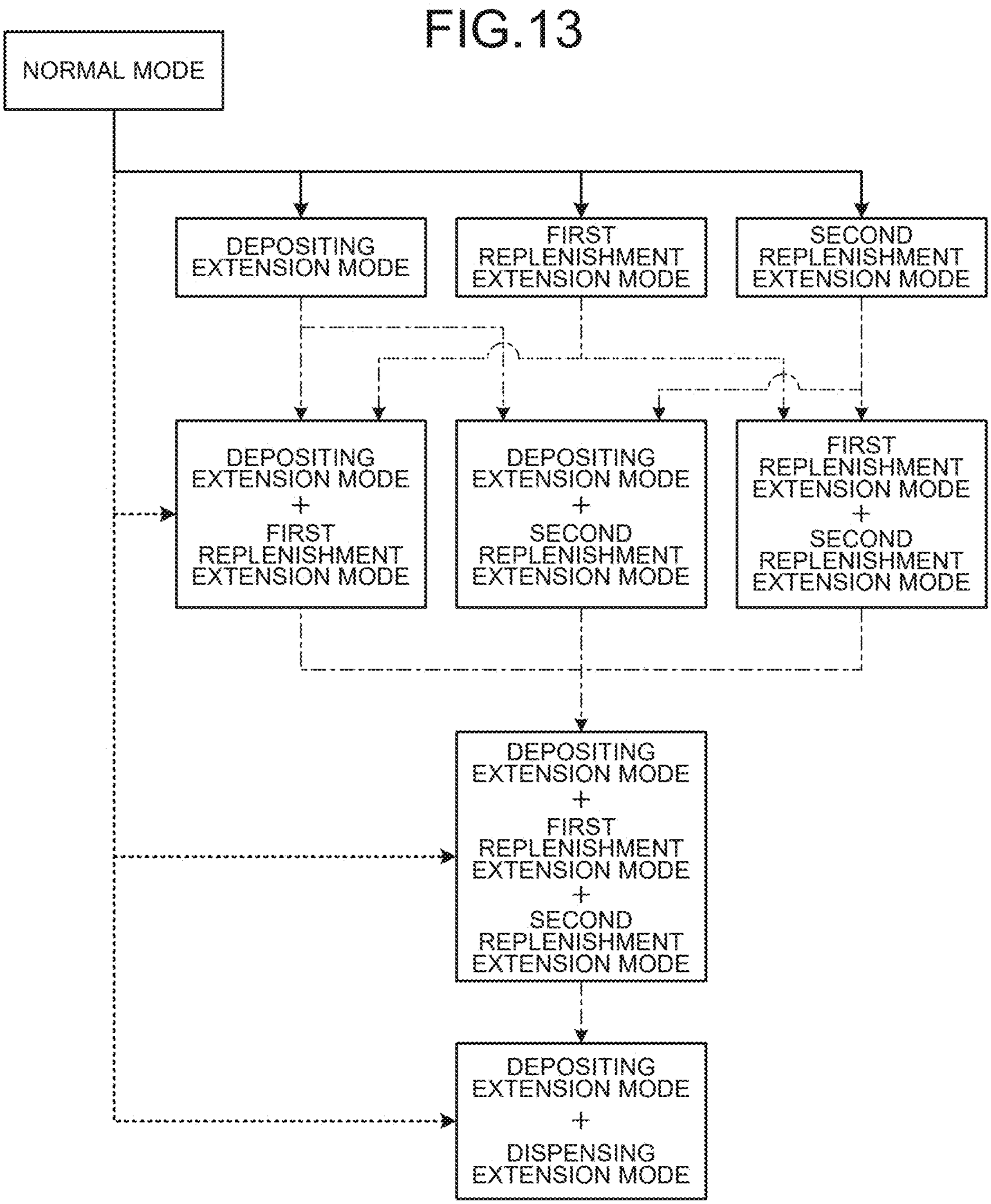
FIG. 13 illustrates an example of switching of an operation mode of the coin handling apparatus.

FIG. 13 illustrates an example of switching of the operation mode of the coin handling apparatus 1. When a shortage denomination has been found and an operation mode switching condition is satisfied, the coin handling apparatus 1 can switch the operation mode from the normal mode to any of the extension modes, i.e., the depositing extension mode, the first replenishment extension mode, and the second replenishment extension mode, as shown by solid-line arrows in FIG. 13. The operation mode to which the normal mode is switched can be changed by the clerk through setting.

The operation mode may not necessarily be switched from the normal mode to one extension mode, and may be switched from the normal mode to an operation mode in which a plurality of extension modes are combined, as shown by broken lines in FIG. 13.

For example, the depositing extension mode may be combined with the first replenishment extension mode, and the normal mode may be switched to an operation mode for performing the depositing process in the depositing extension mode and the replenishment process in the first replenishment extension mode. For another example, the depositing extension mode may be combined with the second replenishment extension mode, and the normal mode may be switched to an operation mode for performing the depositing process in the depositing extension mode and the replenishment process in the second replenishment extension mode. For still another example, the first replenishment extension mode may be combined with the second extension mode, and the normal mode may be switched to an operation mode for performing the replenishment process in the first replenishment extension mode and the replenishment process in the second replenishment extension mode.

The depositing extension mode, the first replenishment extension mode, and the second replenishment extension mode may be combined with each other, and the normal mode may be switched to an operation mode for performing the depositing process in the depositing extension mode, the replenishment process in the first replenishment extension mode, and the replenishment process in the second replenishment extension mode.

In the case of performing the replenishment process in the first replenishment extension mode and the replenishment process in the second replenishment extension mode, coins of the shortage denomination are stored in the second storage unit 52 during the period from when the replenishment process is started to when the replenishment process is completed. Specifically, coins of the shortage denomination are stored in the second storage unit 52 as shown in FIG. 7A, during the period from when the replenishment process is started to when replenishment of the second storage unit 52 with coins for replenishment is ended. Even after the second storage unit 52 is replenished with coins for replenishment, as shown in FIG. 6B, coins of the shortage denomination, among the coins being transported by the transport unit 30, the coins currently stored in the feeding unit 60, and the coins being transported by the feeding unit 60, are stored in the second storage unit 52.

The normal mode may be switched to an operation mode in which the depositing extension mode and the dispensing extension mode are combined. In this case, after the coin handling apparatus 1 has shifted to the depositing extension mode and performed the depositing process as shown in FIG. 5, the coin handling apparatus 1 may perform the dispensing process in which the coins of the shortage denomination, among the coins discharged from the second storage unit 52 to the feeding unit 60, are returned to the second storage unit 52, while storing the other coins into the first storage unit 51, for example. For another example, the coin handling apparatus 1 may perform the first moving process in the dispensing extension mode shown in FIG. 8A, to store the coins of the shortage denomination into the second storage unit 52, and store the other coins into the first storage unit 51. After the second storage unit 52 has become a state where only the coins of the shortage denomination is stored therein, the coin handling apparatus 1 may be operated in the dispensing extension mode as described above.

After shifting from the normal mode to an extension mode, the operation mode may be further shifted to another extension mode. For example, after shifting to any one of the three extension modes, i.e., the depositing extension mode, the first replenishment extension mode, and the second replenishment extension mode, as shown by the solid-line arrows in FIG. 13, the operation mode may be shifted to an operation mode in which any two of the three extension modes are combined, as shown by dashed-and-dotted line arrows. Thereafter, the operation mode may be further shifted to an operation mode in which the depositing extension mode, the first replenishment extension mode, and the second replenishment extension mode are combined. The operation mode may be further shifted to an operation mode in which the depositing extension mode and the dispensing extension mode are combined.

For another example, after shifting from the normal mode to an operation mode in which two of the three extension modes, i.e., the depositing extension mode, the first replenishment extension mode, and the second replenishment extension mode, are combined, as shown by a broken-line arrow in FIG. 13, the operation mode may be shifted to an operation mode in which the three extension modes are combined, as shown by a dashed-and-dotted line arrow. Thereafter, the operation mode may be further shifted to an operation mode in which the depositing extension mode and the dispensing extension mode are combined.

For still another example, after shifting from the normal mode to an operation mode in which the depositing extension mode, the first replenishment extension mode, and the second replenishment extension mode are combined, as shown by the broken-line arrow in FIG. 13, the operation mode may be shifted to an operation mode in which the depositing extension mode and the dispensing extension mode are combined, as shown by the dashed-and-dotted line arrow.

Shifting of the operation mode may be performed based on operation mode switching conditions in which threshold values are set stepwise. Specifically, the threshold values shown in the broken-line frame in FIG. 11 may be set in multiple stages, for example. Upon detecting a shortage denomination that has reached the first-stage threshold value, the operation mode is shifted from the normal mode to any extension mode among the depositing extension mode, the first replenishment extension mode, and the second replenishment extension mode. Then, when the storage state of coins of the shortage denomination has reached the second-stage threshold value, the operation mode is shifted to an operation mode in which any two of the depositing extension mode, the first replenishment extension mode, and the second replenishment extension mode are combined. Thus, the operation mode may be changed based on the threshold values set in multiple stages. In this case, as for the threshold values in the respective stages used for changing the operation mode, different threshold values may be set for the respective denominations, or threshold values may not necessarily be set for some denominations.

Upon detecting a shortage denomination, the coin handling apparatus 1 performs a notification process of notifying the clerk of this fact, switches the operation mode to the extension mode. After that, the coin handling apparatus 1 can return the operation mode to the normal mode when the shortage of coins of the shortage denomination is resolved. For example, the clerk who has received the notification performs replenishment work to replenish the coin handling apparatus 1 with coins of the shortage denomination from the outside of the apparatus. The coin handling apparatus 1 detects this fact, and returns the operation mode to the normal mode. For another example, when shortage of coins is resolved because the number of coins of the shortage denomination being stored in the coin handling apparatus 1 is increased during execution of money handling including the depositing process, the coin handling apparatus 1 detects this fact, and returns the operation mode to the normal mode.

When performing the replenishment process of moving the coins from the first storage unit 51 to the second storage unit 52, the coin handling apparatus 1 can change the transport mode of the lower transport unit **30*d* that transports the coins from the first storage unit 51 to the feeding unit 60**.

In any one among the replenishment process in the normal mode shown in FIG. 4, the replenishment process in the first replenishment extension mode shown in FIGS. 6A and 6B, and the replenishment process in the second replenishment extension mode shown in FIGS. 7A and 7B, the coin handling apparatus 1 can change the coin transport mode from the first storage unit 51 to the feeding unit 60.

Specifically, when a predetermined condition is satisfied while repeating the process of transporting coins from the first storage unit 51 to the feeding unit 60, recognizing the coins by the recognition unit 40, storing coins for replenishment into the second storage unit 52 while returning coins not for replenishment to the first storage unit 51, the transport mode of the lower transport unit **30*d*** can be changed. The change of the transport mode includes at least one of immediately stopping transport, stopping transport after elapse of a predetermined time, and changing the transport speed.

For example, the transport mode is changed on the condition that the number for each denomination of coins for replenishment to be stored in the second storage unit 52 is equal to or less than a predetermined threshold value with respect to all the denominations. For example, the transport mode is changed on the condition that the remaining number for each denomination of coins for replenishing the second storage unit 52 becomes one. However, different threshold numbers may be set for the respective denominations. For some denominations, threshold numbers may not necessarily be set, and the transport mode may be changed based on the threshold numbers set for the other denominations.

The transport mode may be changed to different transport modes for the respective denominations. For example, transport of coins of a certain denomination may be stopped when a threshold number set for this denomination has been reached, while the transport speed of coins of another denomination may be reduced when another threshold number set for this denomination has been reached. Thus, the transport mode may be changed to different transport modes depending on denominations.

In FIG. 2 of the present embodiment, the coin handling apparatus 1 includes the control unit 100, the memory 110, and the communication unit 120. However, as long as the coin handling apparatus 1 can perform the aforementioned processes, the control unit 100, the memory 110, and the communication unit 120 may be disposed outside the coin handling apparatus 1. For example, an external device connected to the coin handling apparatus 1 may include the control unit 100, the memory 110, and the communication unit 120, and the coin handling apparatus 1 may perform the aforementioned processes under control of the external device. The external device may be any device among a banknote handling apparatus, an operation terminal, a cash register, and a server device which are connected to and used with the coin handling apparatus 1, or may be a device other than these.

In the present embodiment, the coin handling apparatus 1 uses two storage units, i.e., the first storage unit 51 and the second storage unit 52. However, this is an example, and does not exclude a device including three or more storage units. For example, the coin handling apparatus 1 may include three or more storage units, and use one of them as the second storage unit 52 while using one selected from the remaining storage units, as the first storage unit 51. For another example, assuming that the first storage unit 51 and the second storage unit 52 are one set of storage units, the coin handling apparatus 1 may include two or more sets of storage units, and handle Japanese currencies with one set as described above while handling US currencies with the other set as described above.

A money handling apparatus according to one aspect of the present disclosure includes: a first storage unit and a second storage unit configured to store money therein; a transport unit configured to transport money; a recognition unit configured to recognize the money being transported by the transport unit; and a control unit configured to transport the money in the first storage unit by using the transport unit, recognize the money by using the recognition unit, transport a part of the money stored in the first storage unit to the second storage unit based on a result of recognition, so that the second storage unit stores money of predetermined denominations for which a quantity of money of each denomination is set in advance. The control unit detects a shortage denomination for which the quantity of money currently stored in the first storage unit is short. When the shortage denomination is detected, the control unit allows to store, into the second storage unit, money of the shortage denomination larger in quantity than the quantity set in advance for the shortage denomination. In the above configuration, the control unit stores money deposited from a depositing unit into the first storage unit. In the above configuration, after performing a dispensing process, the control unit performs a process of storing a part of the money in the first storage unit into the second storage unit before the next depositing process is started. In the above configuration, the control unit may detect the shortage denomination by comparing a mixing ratio for each denomination of a plurality of denominations of money stored in the first storage unit, to a threshold value set in advance for each denomination. The control unit may detect the shortage denomination by comparing the quantity of money of each denomination of a plurality of denominations of money stored in the first storage unit, to a threshold value set in advance for each denomination. In the above configuration, the control unit may perform a replenishment process of replenishing the second storage unit with money of the same denomination and in the same quantity as the money dispensed from the second storage unit in the dispensing process, and detect the shortage denomination by comparing the time required for the replenishment process to a threshold value set in advance for each denomination. In the above configuration, when the control unit cannot feed out money of a denomination for replenishment from the first storage unit during the replenishment process, the control unit may perform substitute replenishment in which the denomination and the quantity of money for replenishment is changed and the changed quantity of money of the changed denomination is dispensed. The control unit may detect the denomination that caused the substitute replenishment as the shortage denomination.

In the above configuration, the control unit may detect the shortage denomination, based on a ratio of the quantity of money of each denomination to the quantity of money of all denominations stored in the first storage unit.

In the above configuration, the control unit may store the money of the shortage denomination into the second storage unit until the quantity of the money of the shortage denomination stored in the second storage unit reaches an upper-limit quantity set for the shortage denomination, and after the upper-limit quantity has been reached, the control unit may store the money of the shortage denomination into the first storage unit.

In the above configuration, when a shortage state of the money of the shortage denomination is resolved because the total quantity of the money of the shortage denomination stored in the first storage unit and the second storage unit is increased while money handing is performed in the money handling apparatus, the control unit may restore to a state in which the second storage unit stores the money of the predetermined denominations for which the quantity of money of each denomination is set in advance.

In the above configuration, when a shortage state of the money of the shortage denomination is resolved because the money of the shortage denomination is supplied from the outside of the apparatus to inside the apparatus, the control unit may restore to a state in which the second storage unit stores the money of the predetermined denominations for which the quantity of money of each denomination is set in advance.

In the above configuration, the control unit may store money for dispensing, which is to be dispensed in a dispensing process, into the second storage unit.

In the above configuration, if the shortage denomination is not detected, the control unit may store money deposited in a depositing process into the first storage unit regardless of denomination. On the other hand, if a shortage denomination is detected, the control unit may store the money of the shortage denomination, among the money deposited in the depositing process, into the second storage unit, and stores money of denominations other than the shortage denomination into the first storage unit.

In the above configuration, the control unit sequentially feeds out money from the first storage unit, recognizes the money by using the recognition unit, transports a part of the money stored in the first storage unit to the second storage unit based on a result of recognition, so that the second storage unit stores the money of the predetermined denominations for which the quantity of money of each denomination is set in advance. After completing storage of the money into the second storage unit, if a shortage denomination is not detected, the control unit may return money that has already been fed out from the first storage unit, into the first storage unit. On the other hand, if a shortage denomination is detected, the control unit may store the money of the shortage denomination, among the money that has already been fed out from the first storage unit, into the second storage unit, and returns money of denominations other than the shortage denomination to the first storage unit.

If a shortage denomination is detected, the control unit may continue to store the money of the shortage denomination into the second storage unit even after the quantity of the money of the shortage denomination in the second storage unit reaches the quantity set in advance for the shortage denomination, during a period from when the process is started to when storage of the money of all predetermined denominations into the second storage unit is completed. Even when the process is for replenishing the second storage unit with money and the shortage denomination is not included in denominations of the money for replenishment, the control unit may store money of the shortage denomination fed out from the first storage unit, into the second storage unit, regardless of whether a quantity of the money of the shortage denomination exceeds the predetermined quantity set in advance.

In the above configuration, the control unit may store, in a depositing process, deposited money into the first storage unit and may dispense, in a dispensing process, money from the second storage unit that stores the money of the predetermined denominations for which the quantity of money of each denomination is set in advance. Upon detecting a shortage denomination, the control unit may store, in the depositing process, the money of the shortage denomination into the second storage unit, and store money of denominations other than the shortage denomination into the first storage unit. In the dispensing process, the control unit may dispense the money of the shortage denomination from the second storage unit, and dispense the money of the other denominations from the first storage unit.

In the above configuration, the control unit, upon detecting the shortage denomination, may select at least one of a plurality of types of extension modes, switches an operation mode, and performs money handing in the selected extension mode. The extension modes include the first extension mode, the second extension mode, the third extension mode and the fourth extension mode. In the first extension mode, a depositing process is performed so that the money of the shortage denomination among deposited money is stored in the second storage unit, and money of denominations other than the shortage denomination is stored in the first storage unit. In the second extension mode, a replenishment process of sequentially feeding out money from the first storage unit and replenishing the second storage unit with money for replenishment is performed so that, after completing replenishment of the second storage unit with the money for replenishment, the money of the shortage denomination among the money having been fed out from the first storage unit is stored in the second storage unit, and the money of the other denominations is returned to and stored in the first storage unit. In the third extension mode, the replenishment process is performed so that, during a period from when the replenishment process is started to when replenishment of the second storage unit with the money for replenishment is completed, the money of the shortage denomination is stored in the second storage unit even after the quantity of money of the shortage denomination in the second storage unit reaches the quantity set in advance for the shortage denomination. In the fourth extension mode, a method for using the first storage unit and the second storage unit is changed so that the money of the shortage denomination is stored in the second storage unit while the money of the other denominations is stored in the first storage unit in the depositing process, and the money of the shortage denomination is dispensed from the second storage unit while the money of the other denominations is dispensed from the first storage unit in the dispensing process.

In the above configuration, after performing the money handing in one or two extension modes selected from three extension modes that are the first extension mode, the second extension mode, and the third extension mode, the control unit may newly select another extension mode from among the three extension modes according to a shortage state of money of the shortage denomination, and perform the money handing by combining the newly selected extension mode with the previously selected one or two extension mode.

In the above configuration, after performing money handing by combining the three extension modes that are the first extension mode, the second extension mode, and the third extension mode, the control unit may select the fourth extension mode according to the shortage state of money of the shortage denomination, and perform money handing in the fourth extension mode.

In the above configuration, the control unit may detect the shortage denomination from among target denominations that are part of denominations of money stored in the first storage unit. The control unit may detect the shortage denomination, based on a threshold value set in advance for each denomination. The threshold value used for the detection may be varied depending on denominations.

A money handling method according to one aspect of the present disclosure is a money handling method to be performed by the money handling apparatus. The method includes: feeding out money from a first storage unit in which money is stored, and recognizing the fed-out money with a recognition unit; transporting a part of the money stored in the first storage unit to a second storage unit based on a result of recognition, so that the second storage unit stores money of predetermined denominations for which a quantity of money of each denomination is set in advance; detecting a shortage denomination for which the quantity of money stored in the first storage unit is short; and upon detecting the shortage denomination, storing money of the shortage denomination larger in quantity than the predetermined quantity set in advance for the shortage denomination, into the second storage unit.

According to the money handling apparatus and the money handling method of the present disclosure, money for dispensing can be efficiently prepared in a predetermined storage unit in the money handling apparatus.

In the present embodiment, the respective processes are described with coins as an example, but the aforementioned processes may be performed for banknotes. In this case, banknotes may be handled as shown in the block diagrams at the lower parts of FIGS. 3A to 9B, by using the two storage units capable of performing storage and feeding-out of banknotes as the first storage unit 51 and the second storage unit 52, respectively.

As described above, the money handling apparatus according to the present embodiment prepares in advance a predetermined quantity of money of predetermined denominations for dispensing, in a second storage unit, separately from a first storage unit that stores money having been deposited through a depositing process. The money handling apparatus performs a dispensing process by using the money in the second storage unit. After the dispensing process, the money handling apparatus performs a replenishment process of replenishing the second storage unit with money fed out from the first storage unit to prepare the predetermined money for the next dispensing process. Upon detecting a shortage denomination for which the quantity of money is short in the first storage unit, the money handling apparatus stores, for the shortage denomination, money larger in quantity than the predetermined quantity that has been set for the dispensing process, into the second storage unit. In performing a depositing process or a replenishment process, the money handling apparatus secures money of the shortage denomination into the second storage unit in advance, thereby avoiding a situation that, when money for dispensing including the money of the shortage denomination needs to be prepared in the second storage unit for a next dispensing process, preparation for the money of the shortage denomination takes a long time.

What is claimed is:

1. A money handling apparatus, comprising:

a first storage and a second storage which store money;

a transport which transports money;

a recognition sensor configured to recognize the money transported by the transport; and a control circuit configured to control the transport to transport the money in the first storage, recognize the money based on a signal from the recognition sensor, and control the transport to transport a part of the money stored in the first storage to the second storage according to a result of recognition, wherein the control circuit detects a shortage denomination for which a quantity of money currently stored in the first storage is short, and allows to store money of the shortage denomination larger in quantity than the quantity of money of the shortage denomination before detecting the shortage denomination in the second storage.

2. The money handling apparatus according to claim 1, wherein the control circuit detects the shortage denomination, based on a ratio of a quantity of money of each denomination to a quantity of money of all denominations, stored in the first storage.

3. The money handling apparatus according to claim 1, wherein the control circuit stores the money of the shortage denomination into the second storage until the quantity of the money of the shortage denomination stored in the second storage reaches an upper-limit quantity set for the shortage denomination, and stores the money of the shortage denomination into the first storage after reaching the upper-limit quantity.

4. The money handling apparatus according to claim 1, wherein the control circuit stores money for dispensing, which is to be dispensed in a dispensing process, into the second storage.

5. The money handling apparatus according to claim 1, wherein while the shortage denomination is not detected, the control circuit stores money deposited in a depositing process into the first storage regardless of denomination, and after detecting the shortage denomination, the control circuit stores the money of the shortage denomination among the money deposited in the depositing process into the second storage, and stores money of denominations other than the shortage denomination into the first storage.

6. The money handling apparatus according to claim 1, wherein when performing a process in which the control circuit sequentially feeds out money from the first storage, recognizes the money via the recognition sensor, transports a part of the money stored in the first storage to the second storage based on a result of recognition, so that the second storage stores the money of predetermined denominations for which the quantity of money of each denomination is set in advance, after completing storage of the money of the predetermined denominations into the second storage, in a case where the shortage denomination has not been detected, the control circuit returns all money that has already been fed out from the first storage, into the first storage, and in another case where the shortage denomination has been detected, the control circuit stores the money of the shortage denomination among the money that has already been fed out from the first storage, into the second storage, and returns money of denominations other than the shortage denomination into the first storage.

7. The money handling apparatus according to claim 1, wherein the control circuit performs a depositing process in which deposited money is stored into the first storage, and performs a dispensing process in which money is dispensed from the second storage that stores therein the money of predetermined denominations for which the quantity of money of each denomination is set in advance, and after detecting the shortage denomination, the control circuit performs the depositing process in which the money of the shortage denomination is stored into the second storage and money of denominations other than the shortage denomination is stored into the first storage, and performs the dispensing process in which the money of the shortage denomination is dispensed from the second storage and the money of the other denominations is dispensed from the first storage.

8. The money handling apparatus according to claim 1, wherein the control circuit detects the shortage denomination from among target denominations that are part of denominations of money stored in the first storage.

9. A money handling apparatus, comprising:

a first storage which stores money;

a second storage which stores money for a dispensing process;

a transport which moves money from the first storage to the second storage;

a recognition sensor configured to recognize money; and a control circuit configured to control the transport to move a part of the money in the first storage to the second storage, and recognize the part of the money based on a signal from the recognition sensor in order to prepare, in the second storage, money to be used for the dispensing process before starting the dispensing process, wherein the control circuit detects a shortage denomination for which a quantity of money currently stored in the first storage is short, and allows to store, in the second storage, money of the shortage denomination larger than a quantity of money of the shortage denomination stored in the second storage before detecting the shortage denomination.

10. The money handling apparatus according to claim 9, wherein the control circuit detects the shortage denomination, based on a ratio of a quantity of money of each denomination to a quantity of money of all denominations, stored in the first storage.

11. The money handling apparatus according to claim 9, wherein the control circuit stores the money of the shortage denomination into the second storage until the quantity of the money of the shortage denomination stored in the second storage reaches an upper-limit quantity set for the shortage denomination, and stores the money of the shortage denomination into the first storage after reaching the upper-limit quantity.

12. The money handling apparatus according to claim 9, wherein the control circuit detects that a total quantity of the money of the shortage denomination stored in the first storage and the second storage is increased while performing money handling and a shortage state of the money of the shortage denomination is resolved, and restores to a state in which the second storage stores the money of predetermined denominations for which the quantity of money of each denomination is set in advance.

13. The money handling apparatus according to claim 9, wherein the control circuit detects that the money handling apparatus is replenished with the money of the shortage denomination supplied from outside the apparatus, and restores to a state in which the second storage stores the money of predetermined denominations for which the quantity of money of each denomination is set in advance.

14. The money handling apparatus according to claim 9, wherein money handling performed by the control circuit includes a moving process for coins currently stored in the second storage, in which the coins discharged from the second storage are recognized by the recognition sensor, and the coin of the shortage denomination is returned to the second storage, while the coin of a denomination other than the shortage denomination is stored in the first storage.

15. The money handling apparatus according to claim 9, wherein while the shortage denomination is not detected, the control circuit stores money deposited in a depositing process into the first storage regardless of denomination, and after detecting the shortage denomination, the control circuit stores the money of the shortage denomination among the money deposited in the depositing process into the second storage, and stores money of denominations other than the shortage denomination into the first storage.

16. The money handling apparatus according to claim 9, wherein when performing a process in which the control circuit sequentially feeds out money from the first storage, recognizes the money via the recognition sensor, and transports a part of the money stored in the first storage to the second storage based on a result of recognition, so that the second storage stores the money of predetermined denominations for which the quantity of money of each denomination is set in advance, after completing storage of the money of the predetermined denominations into the second storage, in a case where the shortage denomination has not been detected, the control circuit returns all money that has already been fed out from the first storage, into the first storage, and in another case where the shortage denomination has been detected, the control circuit stores the money of the shortage denomination among the money that has already been fed out from the first storage, into the second storage, and returns money of denominations other than the shortage denomination into the first storage.

17. The money handling apparatus according to claim 9, wherein when performing a process in which the control circuit sequentially feeds out money from the first storage, recognizes the money via the recognition sensor, and transports a part of the money stored in the first storage to the second storage based on a result of recognition, so that the second storage stores the money of predetermined denominations for which the quantity of money of each denomination is set in advance, and in a case where the shortage denomination has been detected, the control circuit continues to store the money of the shortage denomination into the second storage even after the quantity of the money of the shortage denomination in the second storage reaches the quantity set in advance for the shortage denomination, during a period from when the process is started to when storage of the money of all predetermined denominations into the second storage is completed.

18. The money handling apparatus according to claim 9, wherein the control circuit performs a depositing process in which deposited money is stored into the first storage, and performs a dispensing process in which money is dispensed from the second storage that stores the money of predetermined denominations for which the quantity of money of each denomination is set in advance, and after detecting the shortage denomination, the control circuit performs the depositing process in which the money of the shortage denomination is stored into the second storage and money of denominations other than the shortage denomination is stored into the first storage, and performs the dispensing process in which the money of the shortage denomination is dispensed from the second storage and the money of the other denominations is dispensed from the first storage.

19. The money handling apparatus according to claim 9, wherein the control circuit detects the shortage denomination from among target denominations that are part of denominations of money stored in the first storage.

20. A money handling method performed by a money handling apparatus, the money handling method comprising:

feeding out money from a first storage in which money is stored;

recognizing the fed-out money with a recognition sensor;

transporting a part of the money stored in the first storage to a second storage based on a result of the recognizing;

detecting a shortage denomination for which a quantity of money stored in the first storage is short; and storing, upon detecting the shortage denomination, money of the shortage denomination larger in quantity than the quantity of money of the shortage denomination before detecting the shortage denomination, into the second storage.

* * * * *